(12) United States Patent
Do et al.

(10) Patent No.: US 12,297,954 B2
(45) Date of Patent: May 13, 2025

(54) DISPLAY STAND AND DISPLAY APPARATUS INCLUDING THE SAME

(71) Applicant: SAMSUNG ELECTRONICS CO., LTD., Suwon-si (KR)

(72) Inventors: Yonggu Do, Suwon-si (KR); Jaewook Yoo, Suwon-si (KR); Chulyong Cho, Suwon-si (KR); Soonsuk Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 18/211,914

(22) Filed: Jun. 20, 2023

(65) Prior Publication Data

US 2024/0060595 A1    Feb. 22, 2024

Related U.S. Application Data

(63) Continuation of application No. PCT/KR2023/006688, filed on May 17, 2023.

(30) Foreign Application Priority Data

Aug. 22, 2022   (KR) .................. 10-2022-0105095

(51) Int. Cl.
*F16M 11/18*   (2006.01)
*F16M 11/04*   (2006.01)
*F16M 11/10*   (2006.01)

(52) U.S. Cl.
CPC .......... *F16M 11/18* (2013.01); *F16M 11/041* (2013.01); *F16M 11/105* (2013.01); *F16M 2200/028* (2013.01)

(58) Field of Classification Search
CPC .... F16M 11/18; F16M 11/041; F16M 11/105; F16M 2200/028

(Continued)

(56) References Cited

U.S. PATENT DOCUMENTS 7,274,555 B2 *   9/2007   Kim ..................... F16M 11/046
                                                            248/920
7,643,276 B2     1/2010   Shin
(Continued)

FOREIGN PATENT DOCUMENTS

CN        109058700 A      12/2018
CN        215764425 U       2/2022
(Continued)

OTHER PUBLICATIONS

International Search Report (PCT/ISA/210) issued by the International Searching Authority on Sep. 11, 2023 in corresponding International Application No. PCT/KR2023/006688.
(Continued)

*Primary Examiner* — Anita M King
(74) *Attorney, Agent, or Firm* — Sughrue Mion, PLLC

(57) ABSTRACT

A display stand includes: a support stand comprising a slide groove extending in one direction; a stand arm couplable to a display module and configured to be movable along the slide groove; a slider mounted in the support stand, the slider being coupled to the stand arm and being configured to be slid in the one direction with the stand arm; a locker mounted in the support stand, the locker comprising a stopper movable between a locking position and an unlocking position, when in the locking position, the stopper being interfered with the slider to prevent the stand arm from moving in the one direction along the slide groove; and a supporter couplable to the support stand, the supporter being configured to support the support stand and retain the stopper at the unlocking position by being coupled to the support stand.

20 Claims, 23 Drawing Sheets

(58) Field of Classification Search
USPC .......................................................... 248/127
See application file for complete search history.

(56) References Cited

U.S. PATENT DOCUMENTS

| | | | | |
|---|---|---|---|---|
| 7,712,711 | B2 * | 5/2010 | Jang | ..................... F16M 11/105 |
| | | | | 248/371 |
| 8,132,765 | B2 * | 3/2012 | Liu | ....................... F16M 11/046 |
| | | | | 248/346.06 |
| 8,149,572 | B2 * | 4/2012 | Shen | .................... F16M 11/105 |
| | | | | 248/920 |
| 11,236,855 | B1 | 2/2022 | Lee et al. | |
| 12,000,525 | B2 * | 6/2024 | Shih | ..................... F16M 11/105 |
| 2005/0236533 | A1 | 10/2005 | McRight et al. | |
| 2016/0212866 | A1 | 7/2016 | Luo | |
| 2022/0412502 | A1 * | 12/2022 | Shih | ..................... F16M 11/041 |
| 2023/0333589 | A1 * | 10/2023 | Lee | ....................... G06F 1/1607 |

FOREIGN PATENT DOCUMENTS

| | | |
|---|---|---|
| JP | 2021-144188 A | 9/2021 |
| KR | 10-0435232 B1 | 6/2004 |
| KR | 10-2006-0045467 A | 5/2006 |
| KR | 10-0609180 B1 | 8/2006 |
| KR | 10-2008-0037141 A | 4/2008 |
| KR | 10-2008-0063685 A | 7/2008 |
| KR | 10-2008-0090757 A | 10/2008 |
| KR | 20-0453114 Y1 | 4/2011 |
| KR | 10-1164820 B1 | 7/2012 |
| KR | 10-1597827 B1 | 2/2016 |
| KR | 10-1641219 B1 | 7/2016 |
| KR | 10-2022-0005932 A | 1/2022 |

OTHER PUBLICATIONS

Written Opinion (PCT/ISA/237) issued by the International Searching Authority on Sep. 11, 2023 in corresponding International Application No. PCT/KR2023/006688.

* cited by examiner

FIG. 3
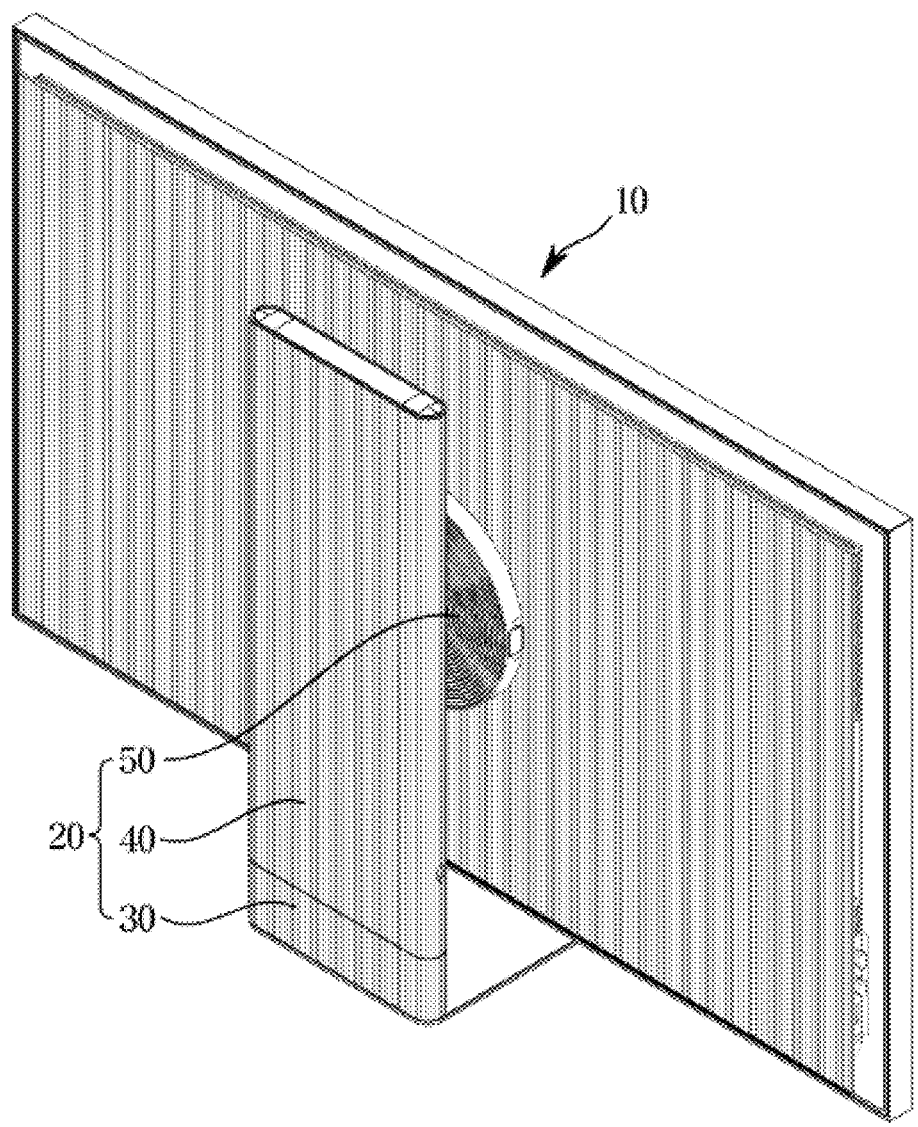
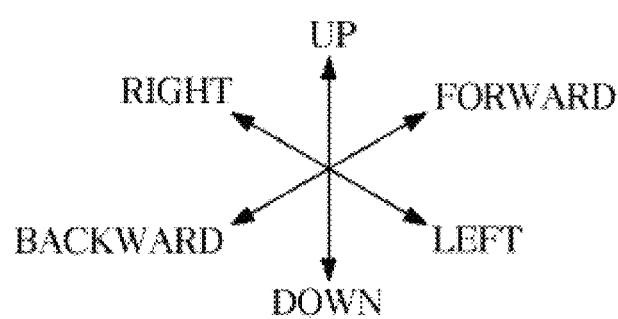

FIG. 21
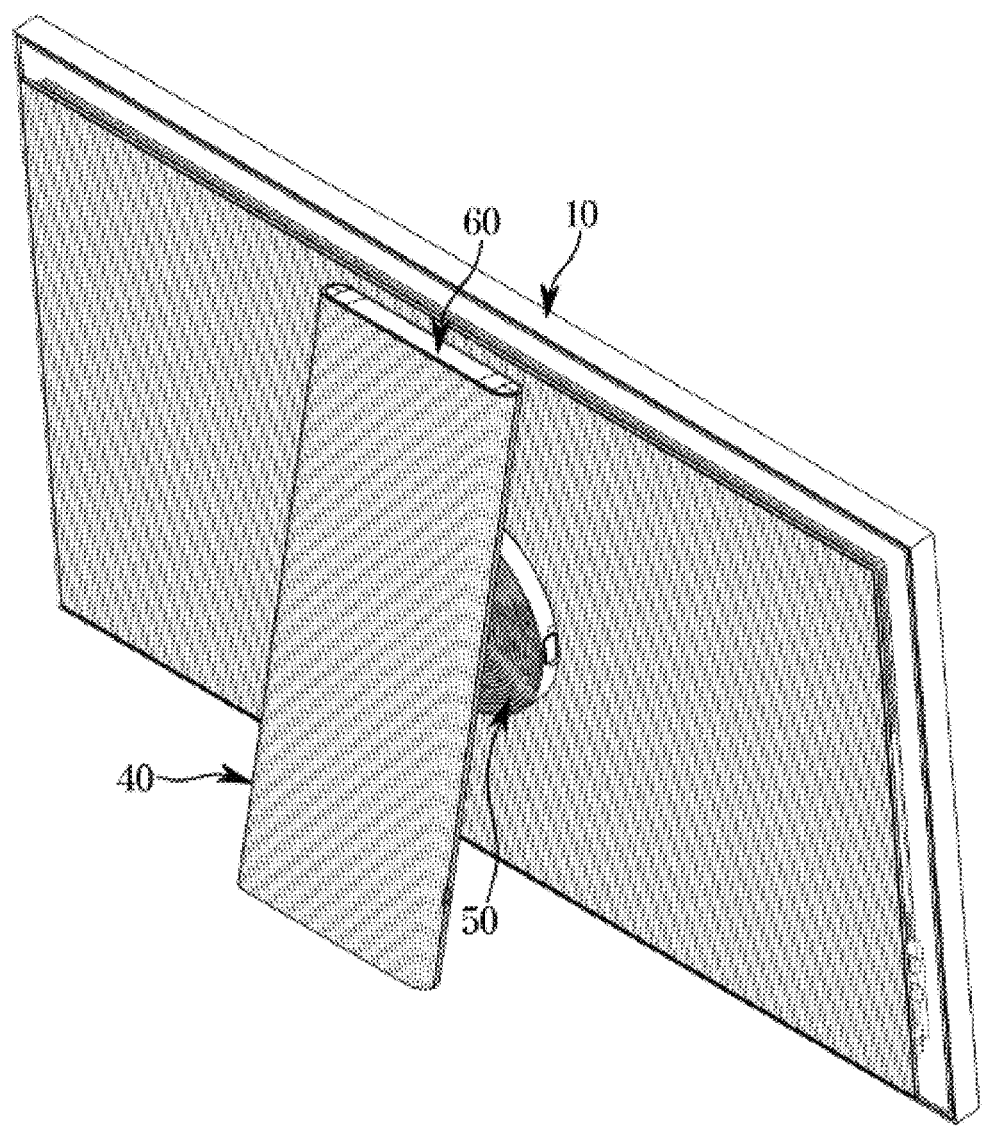
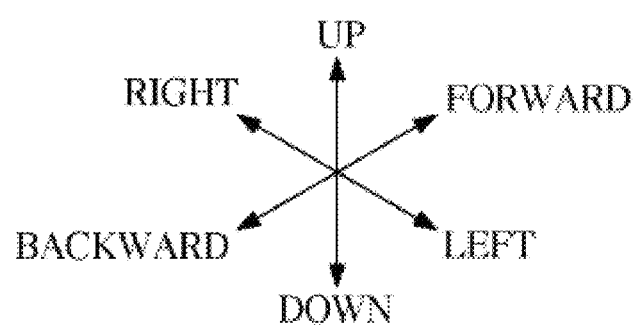

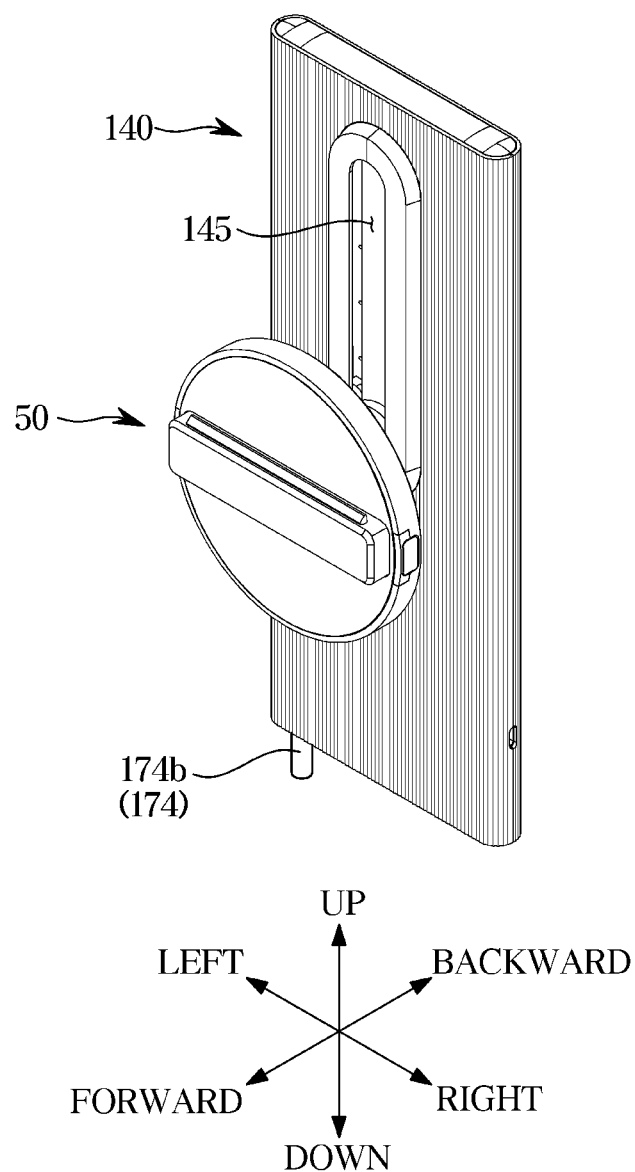

DISPLAY STAND AND DISPLAY APPARATUS INCLUDING THE SAME

CROSS-REFERENCE TO RELATED APPLICATION(S)

This application is a by-pass continuation application of International Application No. PCT/KR2023/006688, filed on May 17, 2023, which is based on and claims priority to Korean Patent Application No. 10-2022-0105095, filed on Aug. 22, 2022, in the Korean Intellectual Property Office, the disclosures of which are incorporated by reference herein in their entireties.

BACKGROUND

1. Field

The disclosure relates to a display stand for supporting a display module and a display apparatus including the same.

2. Description of Related Art

A display apparatus is a type of output device that converts obtained or stored electrical information into visual information and displays the visual information to a user.

A display apparatus may include a self-emissive display panel such as an organic light-emitting diode (OLED) or a non-emissive display panel such as a liquid-crystal display (LCD).

A display apparatus may include a display module including a display panel and displaying an image, and a stand supporting the display module.

SUMMARY

Disclosed embodiments provide a display stand that may support a display module and rotate the display module.

Disclosed embodiments provide a display stand including a locker for preventing movement of a display module and a structure in which the locker is automatically unlocked.

Disclosed embodiments provide a display apparatus that may transport a display module and hold the display module in various modes.

However, technical objectives to be achieved are not limited thereto, and other unmentioned technical objectives will be apparent to one of ordinary skill in the art to which the disclosure pertains from the following description.

A display stand may include: a support stand comprising a slide groove extending in one direction; a stand arm couplable to a display module and configured to be movable along the slide groove; a slider mounted in the support stand, the slider being coupled to the stand arm and being configured to slide in the one direction with the stand arm; a locker mounted in the support stand, the locker comprising a stopper movable between a locking position and an unlocking position, when in the locking position, the stopper being interfered with the slider to prevent the stand arm from moving in the one direction along the slide groove, when in the unlocking position, the stopper being spaced apart from the slider to allow the stand arm to move in the one direction along the slide groove; and a supporter couplable to the support stand, the supporter being configured to support the support stand and retain the stopper at the unlocking position by being coupled to the support stand.

The locker may further include a push protrusion configured to interfere with the supporter. The supporter may be configured to push the push protrusion to locate the stopper at the unlocking position.

The support stand may further include a supporter groove configured to receive the supporter when inserted. The push protrusion may be configured to be pushed by the supporter that is inserted into the supporter groove.

The supporter groove may be disposed in a lower portion of the support stand.

The support stand may further include a penetrating wall including a through-hole configured to receive the push protrusion. The push protrusion may include a protrusion portion configured to be accommodated in the through-hole and to contact the supporter, and a locking portion connected to the protrusion portion, the locking portion being configured to be caught by the penetrating wall.

The locker may further include: a guide member disposed on the support stand, the guide member being configured to be movable in the one direction; and a link member disposed between the guide member and the stopper, and configured to move the stopper as the guide member moves.

The locker may further include a push protrusion extending from the guide member and configured to interfere with the supporter. The guide member may be disposed on an upper side of the push protrusion and is configured to be moveable in the one direction as the push protrusion moves. The stopper may be disposed at an upper side of the guide member. The link member may be configured to move the stopper as the guide member is moved in the one direction by the push protrusion.

The guide member may include a coupling shaft configured to couple to the link member. The stopper may include a stopper shaft configured to couple to the link member. The link member may include a coupling hole into which the coupling shaft is configured to insert, and a stopper hole into which the stopper shaft is configured to insert.

The link member may be configured to move the stopper to the unlocking position as the guide member moves upward. The link member may be configured to move the stopper to the locking position as the guide member moves downward.

The slider may include a rack gear extending in the one direction. The stopper may include an interference gear configured to engage with the rack gear when the stopper is in the locking position.

The slider may be a first slider. The display stand may further include: a second slider mounted in the support stand, the second slider being coupled to the stand arm and being configured to slide in the one direction along the slide groove, the second slider being disposed in parallel with the first slider; and a holding damper configured to reduce a speed of the second slider moving in the one direction along the slide groove.

The holding damper may include a hydraulic damper.

The display stand may further include a handle coupled to an upper side of the support stand, the handle being configured to be slidably withdrawn from the support stand.

The handle may include a holding portion, and insertion portions extending from opposite sides of the holding portion toward the support stand, the insertion portions being slidably insertable into the support stand. The display stand may further include a handle damper located at a lower side of the insertion portions, the handle damper being configured to move the insertion portions in the one direction.

The support stand may include a battery provided therein, the battery being configured to apply power to the display module.

A display stand may include: a stand arm couplable to a display module; a support stand configured to support the stand arm such that the stand arm is configured to rotate with respect to the support stand, the support stand including a slide groove configured to guide movement of the stand arm in one direction such that the display module coupled to the stand arm moves in the one direction; a slider mounted in the support stand, the slider being configured to move in the one direction along the slide groove with the stand arm; a locker disposed at a side of the slider, the locker including a stopper and a push protrusion, the stopper being movable between a locking position and an unlocking position, when in the locking position, the stopper being interfered with the slider to prevent slider from moving in the one direction, when in the unlocking position, the stopper being spaced apart from the slider to allow the slider to move in the one direction, the push protrusion being configured to guide movement of the stopper between the locking position and the unlocking position; and a supporter coupled to the support stand, the supporter being configured to support the support stand. The supporter may be configured to push the push protrusion into the support stand, causing the stopper to be moved from the locking position to the unlocking position.

The support stand may further include a supporter groove disposed in a lower portion of the support stand such that the supporter is configured to insert into the supporter groove. The push protrusion may be configured to protrude into the supporter groove.

The locker may further include: a guide member disposed at an upper side of the push protrusion, the guide member being configured to move in the one direction by the push protrusion; and a link member disposed between the guide member and the stopper, the link member being configured to move the stopper between the locking position and the unlocking position as the guide member moves.

The slider may be a first slider. The display stand may further include: a second slider mounted in the support stand, the second slider being coupled to the stand arm and being configured to slide in the one direction along the slide groove, the second slider being disposed in parallel with the first slider; and a holding damper configured to reduce a speed of the second slider moving in the one direction along the slide groove, the holding damper including a holding gear engaged with the second slider.

A display apparatus may include: a display module; a stand arm coupled to the display module, the stand arm being configured to support the display module; a support stand extending in one direction, the support stand being configured to support the stand arm such that the stand arm is movable, the support stand comprising a slide groove extending in the one direction, the slide groove being configured to guide movement of the stand arm in the one direction; a slider mounted in the support stand, the slider being movable in the one direction along the slide groove with the stand arm; a locker mounted in the support stand, the locker including a stopper movable between a locking position and an unlocking position, when in the locking position, the stopper being interfered with the slider to prevent the stand arm from moving in the one direction along the slide groove, when in the unlocking position, the stopper being spaced apart from the slider to allow the stand arm to move in the one direction along the slide groove; and a supporter couplable to the support stand, the supporter being configured to support the support stand, and retain the stopper at the unlocking position by being coupled to the support stand.

BRIEF DESCRIPTION OF THE DRAWINGS

FIG. 3 is a rear perspective view illustrating the display apparatus of FIG. 1.

FIG. 21 is a rear perspective view illustrating a state in which a support stand tilts a display module, according to an embodiment of the disclosure.

FIG. 23 is a perspective view illustrating a support stand, according to an embodiment of the disclosure.

DETAILED DESCRIPTION

Figure 1:
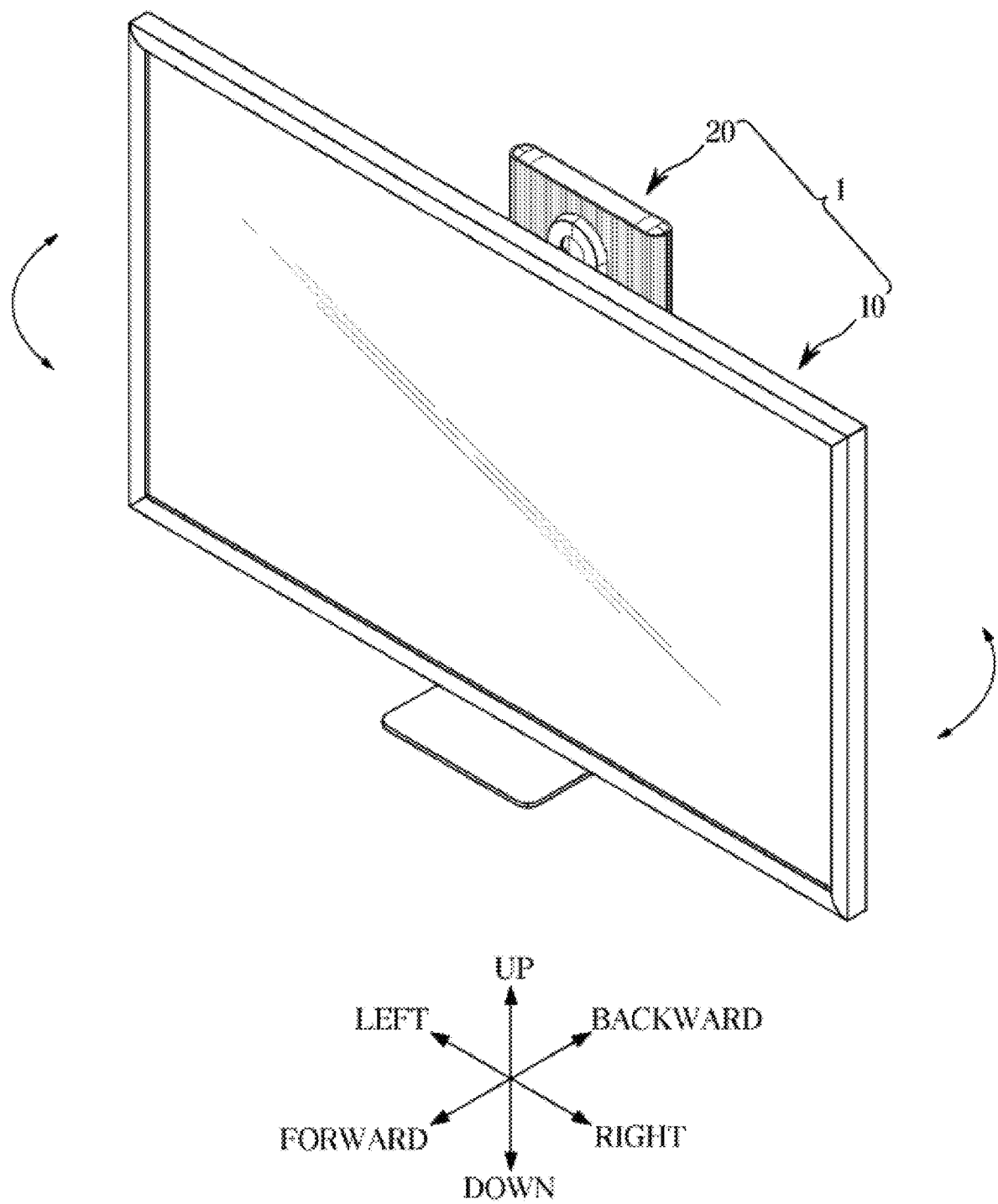
FIG. 1 is a perspective view illustrating a display apparatus, according to an embodiment of the disclosure.

The description proposed herein is just a preferable example for the purpose of illustrations only, not intended to limit the scope of the disclosure, so it should be understood that other equivalents and modifications could be made thereto without departing from the scope of the disclosure.

Also, like reference numerals or signs in the drawings of the specification denote like components or elements that perform substantially the same functions.

Also, the terms used in the present specification are merely used to describe embodiments, and are not intended to limit and/or restrict the disclosure. The singular forms "a," "an," and "the" are intended to include the plural forms as well, unless the context clearly indicates otherwise. Further, as used in this specification, the terms "include," "have" and their conjugates may be construed to denote a feature, number, step, operation, constituent element, component, or a combination thereof, but may not be construed to exclude the existence or addition of one or more other features, numbers, steps, operations, constituent elements, components, or combinations thereof.

It will be understood that although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

The terms "upward" and "downward" used herein are defined based on the drawings, and a shape and a position of each element are not limited by these terms.

Figure 2:
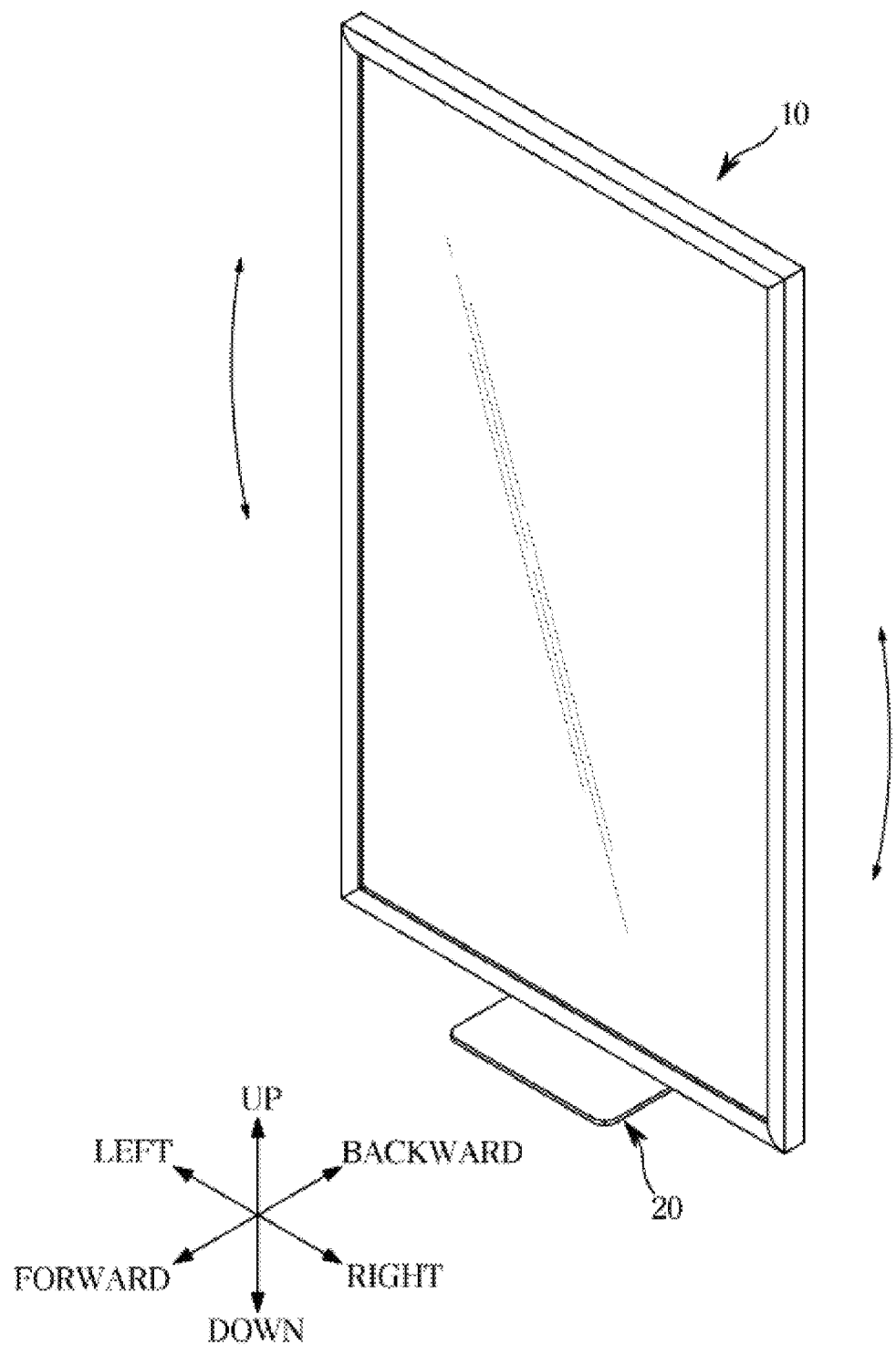
FIG. 2 is a perspective view illustrating a display apparatus in which a display module is vertically rotated, according to an embodiment of the disclosure.
Figure 4:
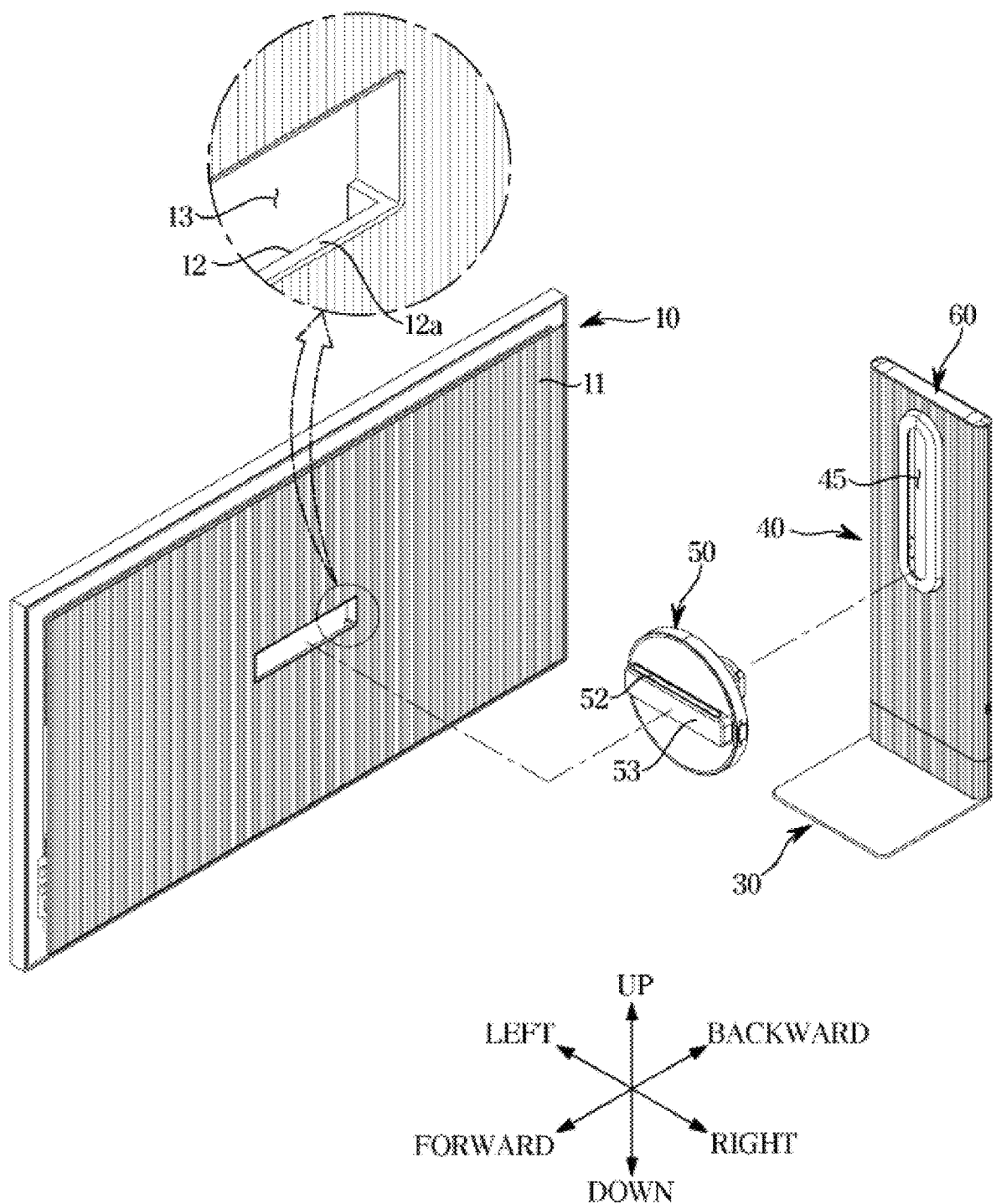
FIG. 4 is an exploded perspective view illustrating a display module and a display stand, according to an embodiment of the disclosure.

FIG. 1 is a perspective view illustrating a display apparatus, according to an embodiment of the disclosure. FIG. 2 is a perspective view illustrating a display apparatus in which a display module vertically rotates, according to an embodiment of the disclosure. FIG. 3 is a rear perspective view illustrating the display apparatus of FIG. 1. FIG. 4 is an exploded perspective view illustrating a display module and a display stand, according to an embodiment of the disclosure.

Referring to FIGS. 1 to 4, a display apparatus 1 may include a display module 10 that displays information, data, and the like as characters, shapes, graphs, and images. Examples of the display module 10 may include a television and a monitor.

The display module 10 may be configured to display a screen. The display module 10 may include a self-emissive display panel (not shown) such as an organic light-emitting display (OLED) or a non-emissive display panel (not shown) such as a liquid-crystal display (LCD). There is no particular limitation on the type of a display panel.

Referring to FIGS. 1 to 4, the display module 10 may be provided so that a length of a horizontal side and a length of a vertical side are different from each other. That is, the display module 10 may be provided to have a long side and a short side. The display module 10 may be provided in a rectangular plate shape. Also, unlike in FIGS. 1 to 4, the display module 10 may be provided as a curved display with a round long side.

The display apparatus 1 may include the display module 10, and a display stand 20 supporting the display module 10. The display stand 20 may be coupled to the display module 10 to support the display module 10.

The display stand 20 may include a support stand 40, a supporter 30, and a stand arm 50. The supporter 30 may be provided under the support stand 40. The stand arm 50 may be provided in front of the support stand 40. The stand arm 50 may be coupled to the display module 10 and supported by the support stand 40.

The display module 10 may be rotatable by the stand arm 50. As shown in FIG. 2, the display module 10 may rotate so that a long side vertically extends. As shown in FIG. 1, the display module 10 may be rotated clockwise or counterclockwise, when viewed from the top, by the stand arm 50.

The support stand 40 may include a slide groove 45 formed to face the display module 10 and may extend in one direction. The slide groove 45 may vertically extend. The stand arm 50 may be provided to be movable in one direction along the slide groove 45. As the stand arm 50 moves along the slide groove 45, the display module 10 may also move in one direction.

A fixing groove 13 may be provided in a rear surface 11 of the display module 10. A part of the stand arm 50 may be inserted into the fixing groove 13. Locking grooves 12 may be formed in an upper portion and a lower portion of the fixing groove 13, and the fixing groove 13 and the locking grooves 12 may communicate with each other.

Fixing members 52 of the stand arm 50 may be inserted into the locking grooves 12. The fixing member 52 may be caught by a locking wall 12a of the locking groove 12. Accordingly, the display module 10 may be coupled to be supported by the stand arm 50.

The support stand 40 may apply power to the display module 10 through the stand arm 50. For example, the support stand 40 may be connected to a wire that supplies power, to apply power to the display module 10.

In another example, the display module 10 may be directly connected to the wire to receive power.

The support stand 40 may include a battery (not shown). According to this structure, when only the support stand 40 is charged to apply power to the display module 10, the display module 10 may receive power required to transmit an image, and thus, a separate wire may not be required. Accordingly, because a restriction of a place or the like due to the wire may be reduced, user satisfaction may be improved.

A handle 60 provided to move the display module 10 and the support stand 40 may be provided at an upper side of the support stand 40.

The supporter 30 that may be coupled to the support stand 40 to support the support stand 40 may be provided at a lower side of the support stand 40.

Figure 5:
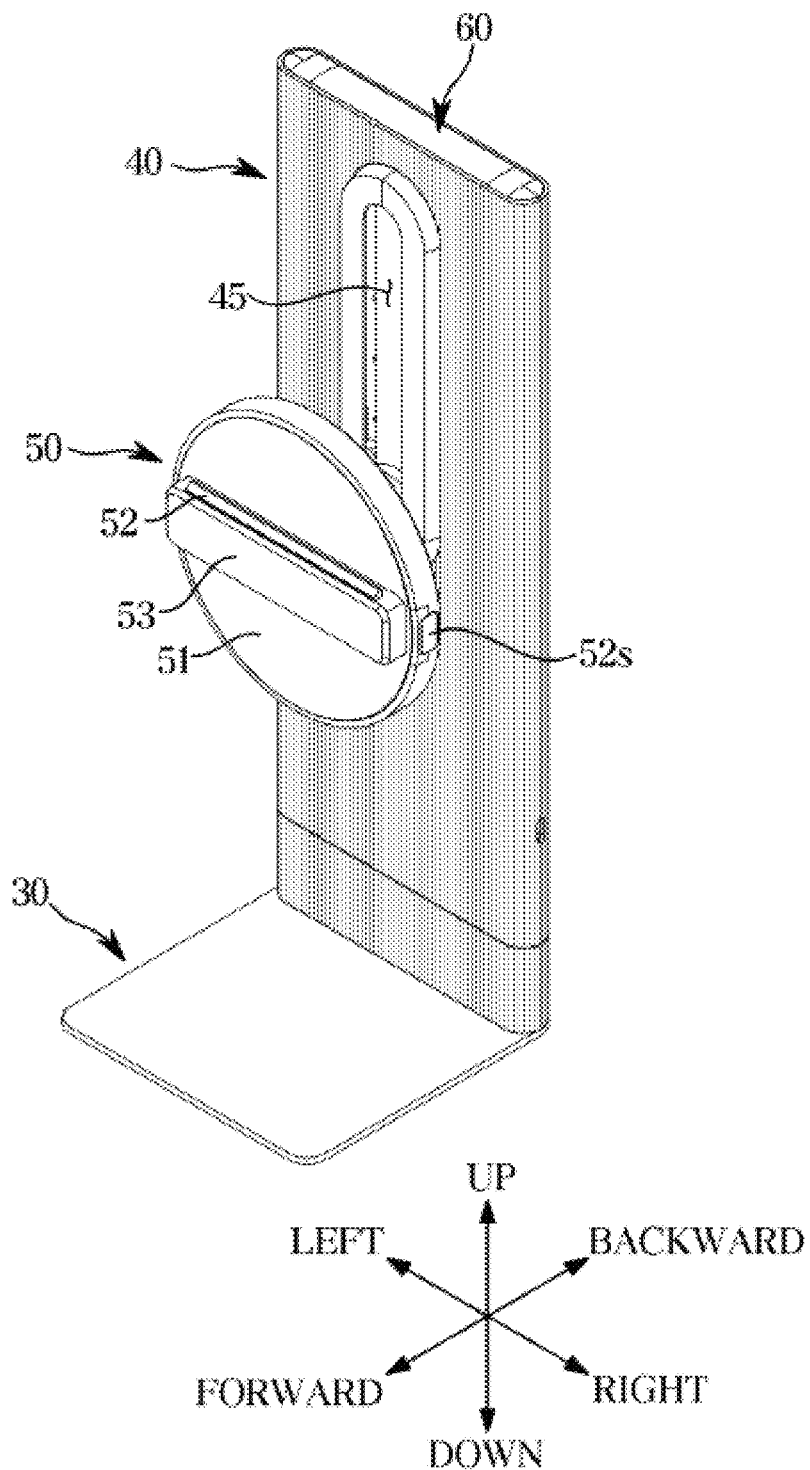
FIG. 5 is a perspective view illustrating a display stand, according to an embodiment of the disclosure.
Figure 6:
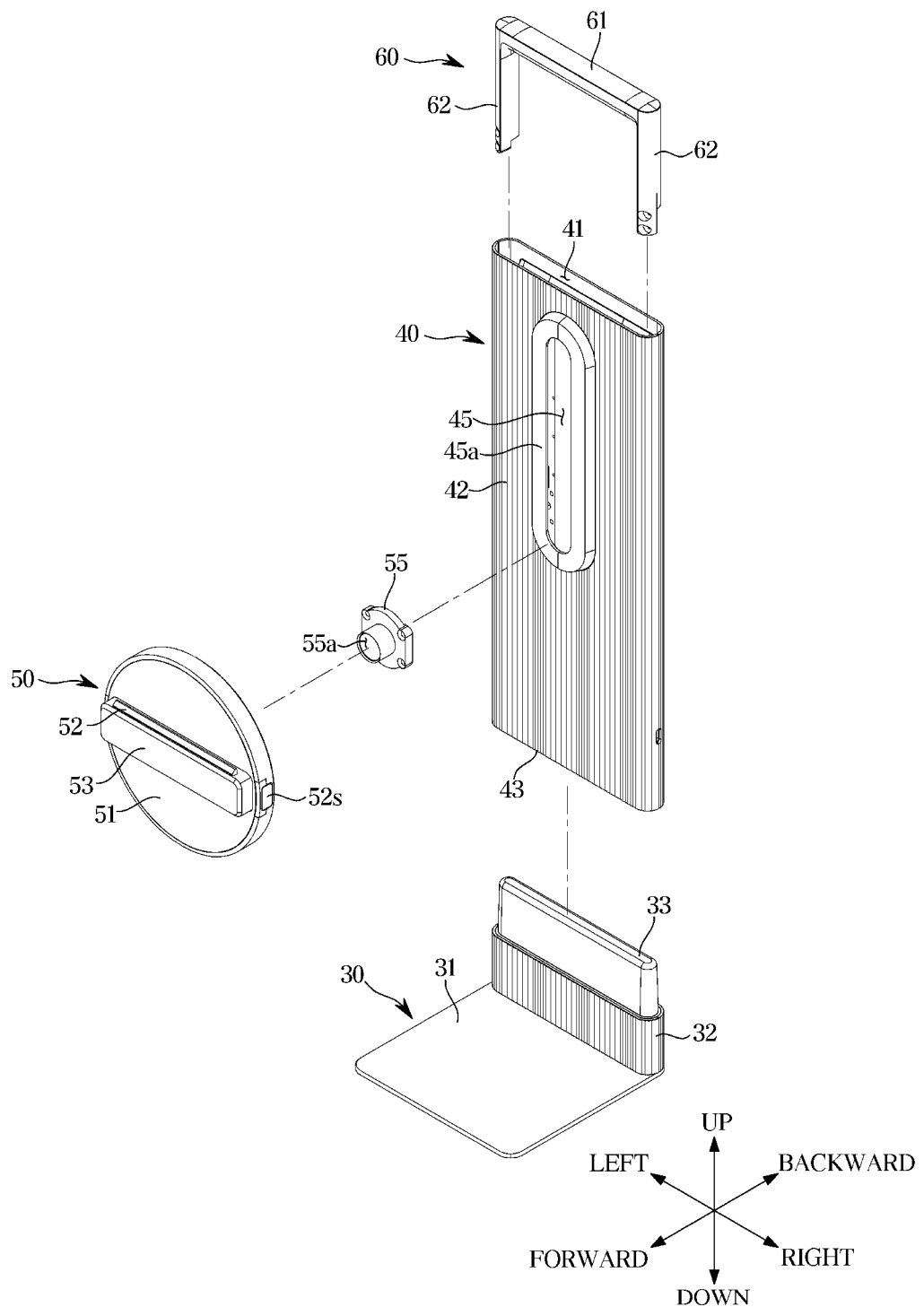
FIG. 6 is an exploded perspective view illustrating the display stand of FIG. 5.
Figure 7:
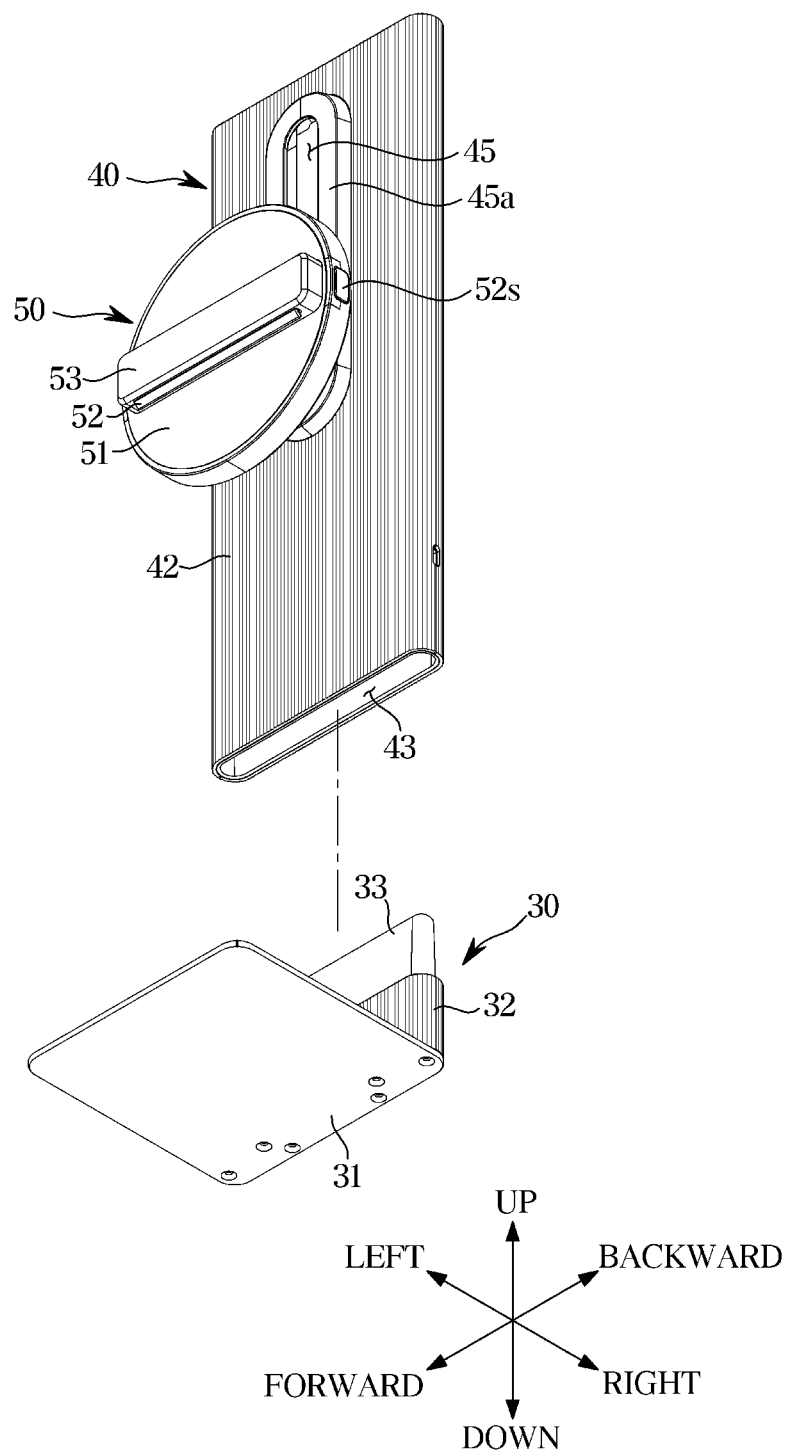
FIG. 7 is an exploded perspective view illustrating a support stand and a supporter of the display stand of FIG. 5.
Figure 8:
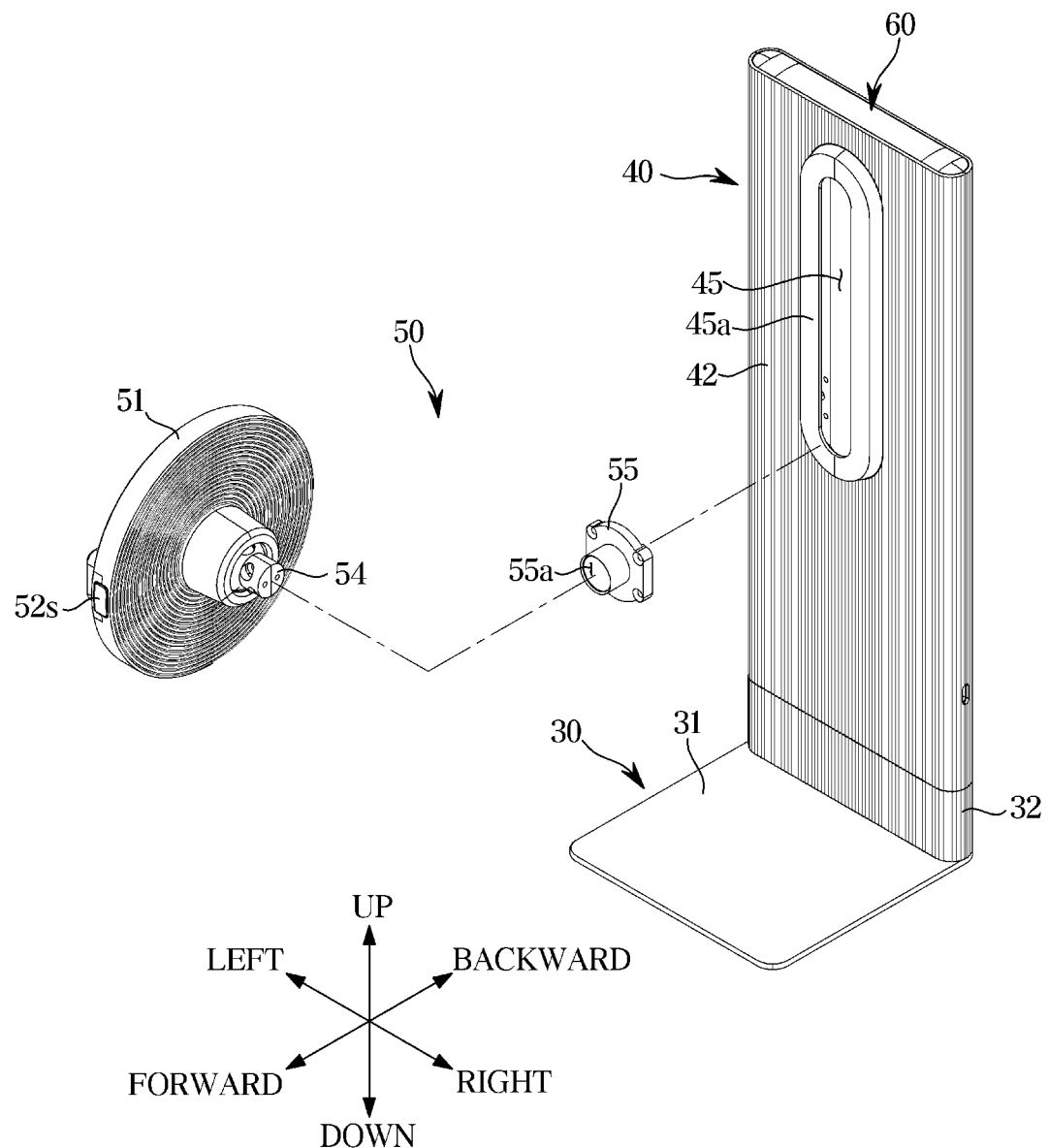
FIG. 8 is an exploded perspective view illustrating a part of a stand arm of the display stand of FIG. 5, viewed from the back.
Figure 9:
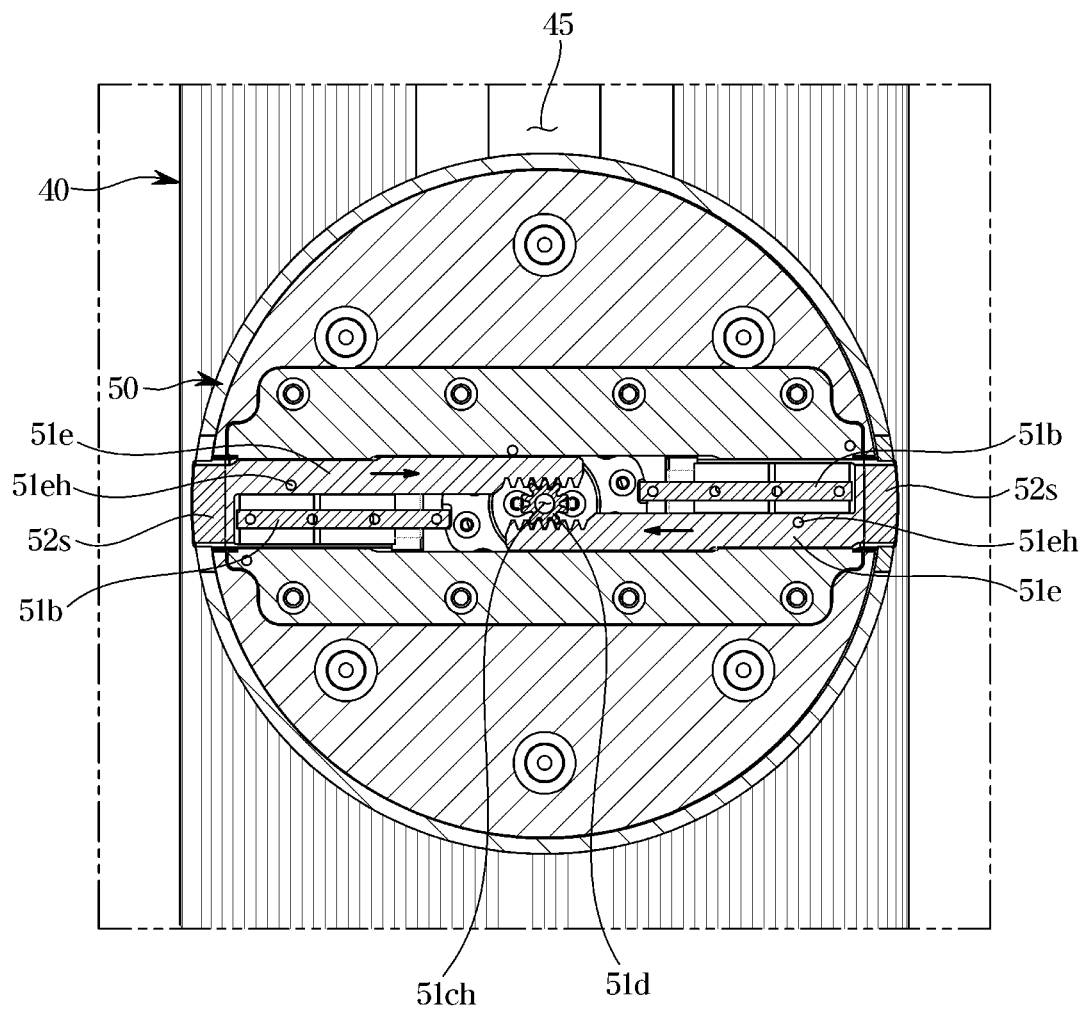
FIGS. 9 to 12 are cross-sectional views illustrating an operation of a fixing member according to an arm button of a stand arm, according to an embodiment of the disclosure.
Figure 10:
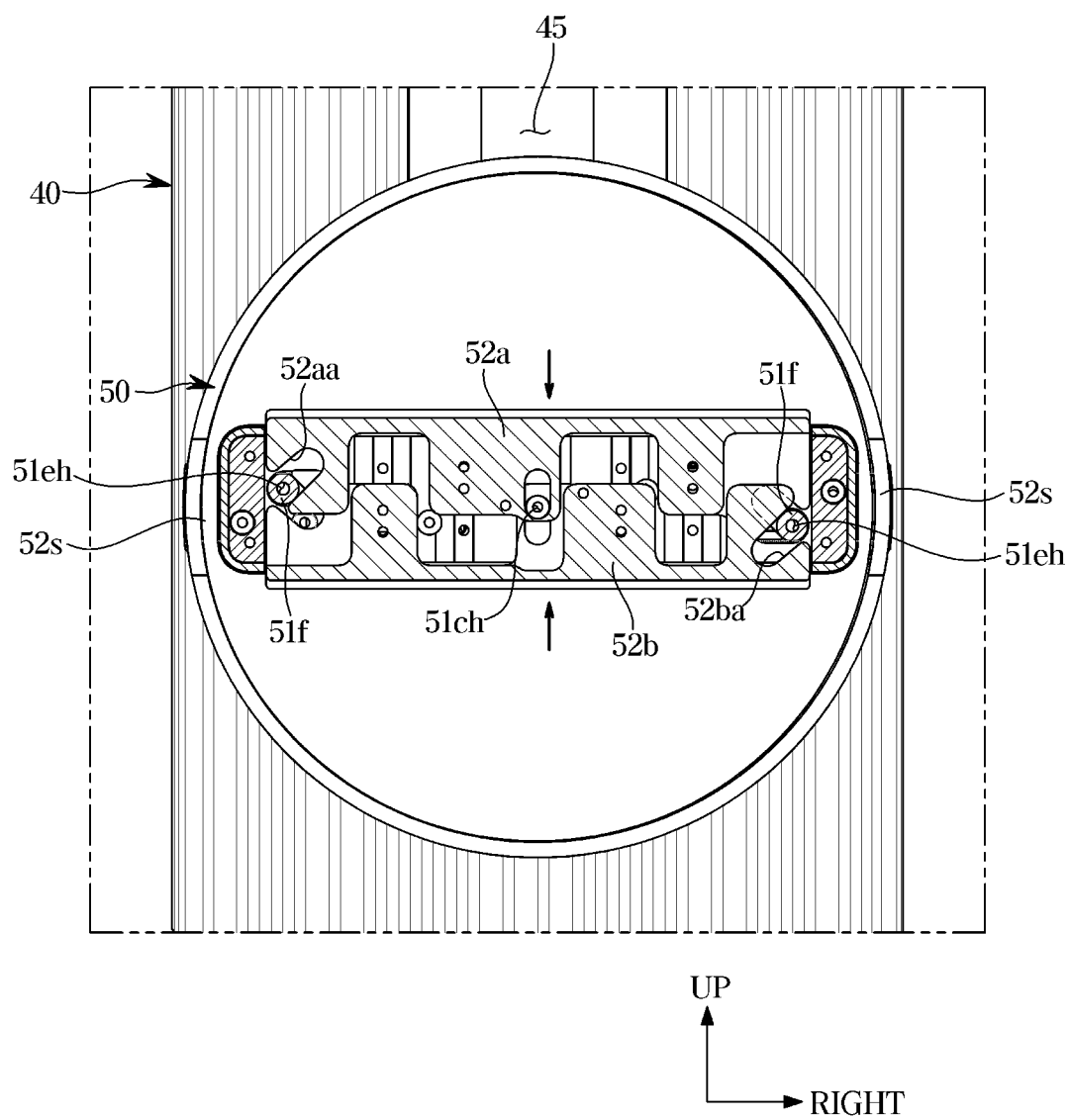
Figure 11:
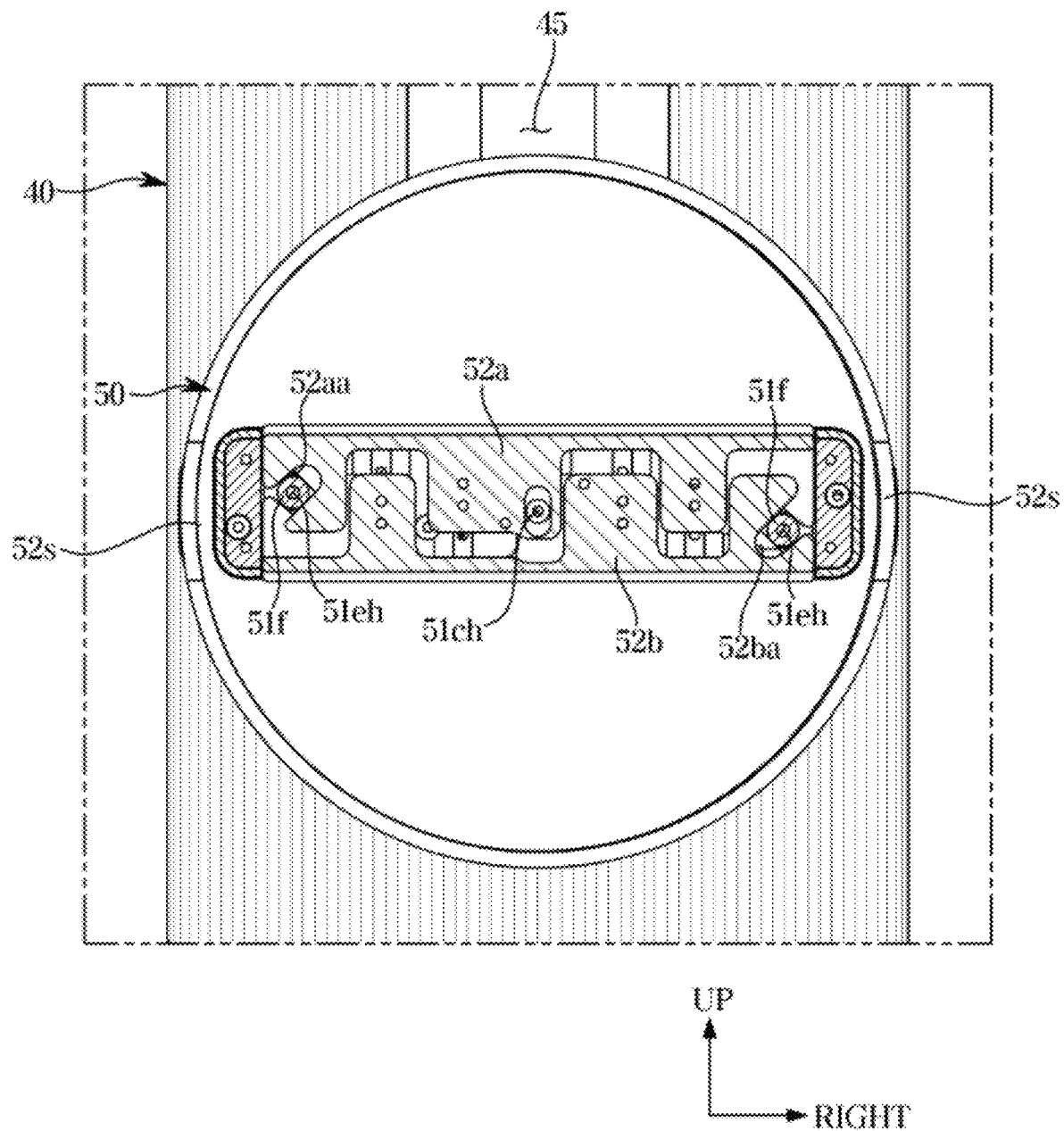

FIG. 5 is a perspective view illustrating a display stand, according to an embodiment of the disclosure. FIG. 6 is an exploded perspective view illustrating the display stand of FIG. 5. FIG. 7 is an exploded perspective view illustrating a support stand and a supporter of the display stand of FIG. 5. FIG. 8 is an exploded perspective view illustrating a part of a stand arm of the display stand of FIG. 5, viewed from the back.

Referring to FIGS. 5 to 8, the stand arm 50 may be located at a front side of the support stand 40. The handle 60 may be located at an upper side of the support stand 40. The supporter 30 may be provided at a lower side of the support stand 40.

The supporter 30 may be inserted into a lower portion of the support stand 40 to support the support stand 40. The supporter 30 may include a support plate 31 extending in a front-back direction and an insertion protrusion 33 extending upward from the support plate 31.

The support plate 31 may be a plate to be supported on the floor or a desk. The insertion protrusion 33 may be inserted into a supporter groove 43 of the support stand 40. The insertion protrusion 33 may extend from the support plate 31 toward the support stand 40.

The supporter 30 may include a supporter cover 32 provided under the insertion protrusion 33. The supporter cover 32 may cover a part of the insertion protrusion 33, and may be integrally formed with the insertion protrusion 33.

The support stand 40 may include the supporter groove 43 provided in a lower portion so that the insertion protrusion 33 is inserted into the supporter groove 43. The support stand 40 may include a handle groove 41 provided in an upper portion to accommodate the handle 60.

The support stand 40 may vertically extend, and may include a stand cover 42 forming an outer appearance. A pair of stand covers 42 may be provided to be coupled in the front-back direction, or may be integrally formed with each other.

The stand cover 42 and the support cover 32 may be formed of the same material. Accordingly, when the support stand 40 and the supporter 30 are coupled to each other to be recognized as one element, aesthetics may be improved.

The support stand 40 may include the slide groove 45 formed in a front surface adjacent to the stand arm 50. The slide groove 45 may guide the stand arm 50 to vertically move.

The stand arm 50 may be provided to move along the slide groove 45. In more detail, the stand arm 50 may vertically move the display module 10 along the slide groove 45. The stand arm 50 may rotate the display module 10 while being inserted into the slide groove 45 when the display module 10 (see FIG. 1) is viewed from the front, and may rotate the display module 10 clockwise or counterclockwise when the display module 10 is viewed from the top.

The support stand 40 may include an edge wall 45a formed on an edge of the slide groove 45. The edge wall 45a may protrude from the stand cover 42 toward the stand arm 50, and may guide movement of an arm coupling portion 55 moving along the slide groove 45.

As shown in FIG. 1, a mode in which the display module 10 rotates clockwise or counterclockwise when viewed from the top may be referred to as a swivel mode.

As shown in FIG. 2, a mode in which the display module 10 rotates clockwise or counterclockwise when viewed from the front so that a long side vertically extends may be referred to as a portrait mode.

The stand arm 50 may include an arm body 51 provided in a circular shape, and a fixing support 53 protruding from the arm body 51 toward the display module 10. Arm buttons 52s may be provided on both sides of the arm body 51.

The arm buttons 52s may be pushed from both sides of the arm body 51 into the arm body 51, and as the arm buttons 52s are pushed into the arm body 51, the fixing member 52 may be inserted into the fixing support 53.

That is, a user may insert the fixing support 53 into the fixing groove 13 of the display module 10 by pushing the arm buttons 52s into the arm body 51. Next, the user may release the arm buttons 52s so that the fixing member 52 vertically protrudes from the fixing support 53 to be caught by the locking wall 12a. Accordingly, the stand arm 50 may be coupled to the display module 10.

The stand arm 50 may include the arm coupling portion 55 provided in the slide groove 45, and a swivel hinge 54 inserted into an arm coupling groove 55a of the arm coupling portion 55. The swivel hinge 54 may be inserted into the arm coupling groove 55a to rotate the arm body 51.

FIGS. 9 to 12 are cross-sectional views illustrating an operation of a fixing member according to an arm button of a stand arm, according to an embodiment of the disclosure. Movement of the fixing member 52 according to the arm button 52s will be described in detail with reference to FIGS. 9 to 12.

Referring to FIGS. 9 to 12, the fixing member 52 may include a first fixing member 52a and a second fixing member 52b. A pair of arm buttons 52s may be provided on both sides of the arm body 51 (see FIG. 6). As the pair of arm buttons 52s are pushed to be closer to each other, a pair of locking guiders 51e respectively contacting the arm buttons 52s may be pushed.

The pair of locking guiders 51e may be located at different heights and may rotate clockwise a pinion gear 51d engaged with the locking guiders 51e.

Each of the pair of locking guiders 51e may move a connection protrusion 51f through a connection shaft (not shown) provided in a connection hole 51eh. A pair of connection protrusions 51f may be provided, and may be provided in a protrusion groove 52aa of the first fixing member 52a or a protrusion groove 52ba of the second fixing member 52b.

The pair of locking guiders 51e moving closer to each other may move the connection protrusions 51f away from the pair of arm buttons 52s, and thus, the first fixing member 52a and the second fixing member 52b may be pushed to be closer to each other.

The second fixing member 52b located below the first fixing member 52a may be pushed upward, and the first fixing member 52a may be pushed downward. Accordingly, as shown in FIG. 4, the fixing support 53 may be inserted into the fixing groove 13 while the fixing member 52 is not interfered with the locking wall 12a.

Figure 12:
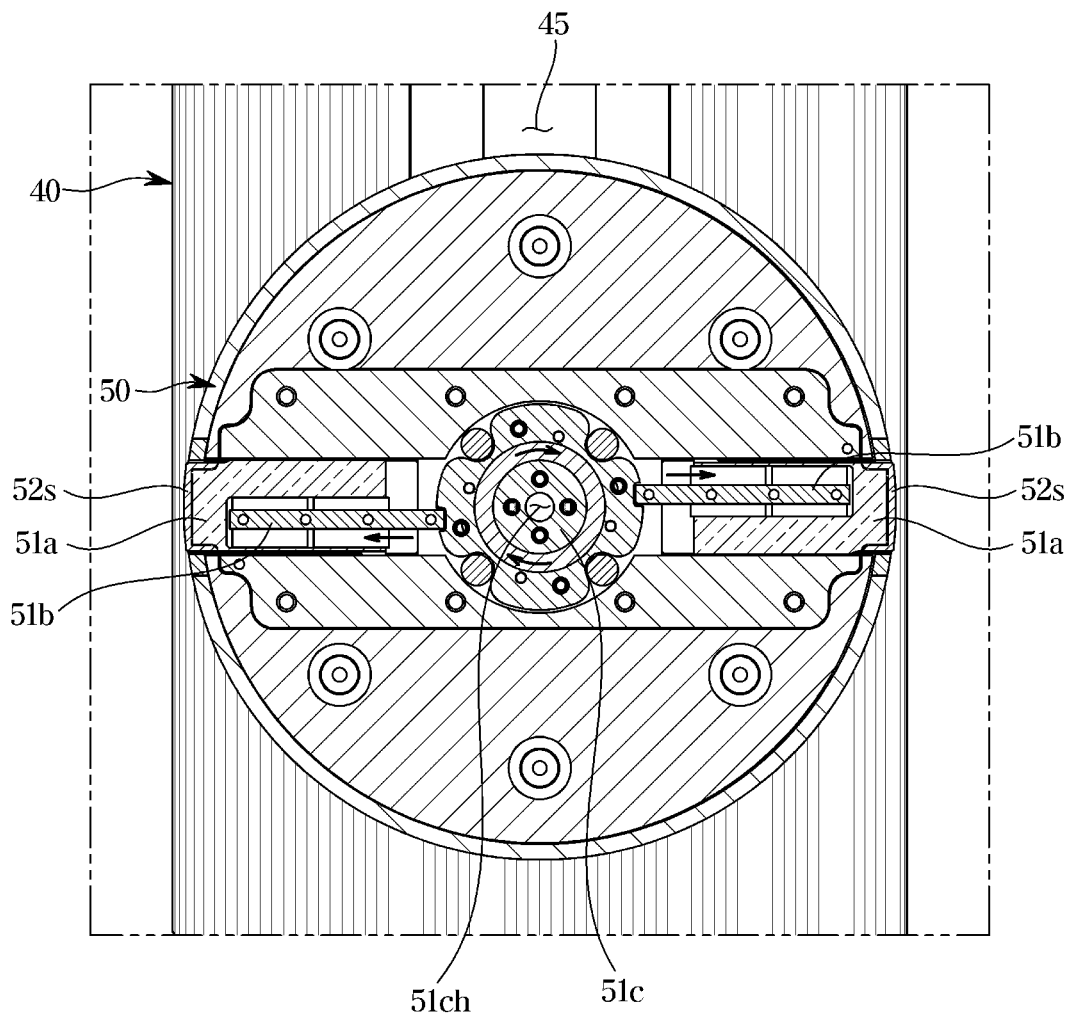

As shown in FIG. 12, a mover 51a, a button pusher 51b, and a rotating member 51c may be provided between the pair of arm buttons 52s. A pair of movers 51a and a pair of button pushers 51b may be provided.

The rotating member 51c coupled to the pinion gear 51d through a gear shaft (not shown) provided in a gear shaft hole 51ch may rotate clockwise in response to the pinion gear 51d. As the rotating member 51c pushes the pair of button pushers 51b located on both sides to be away from each other, the arm button 52s coupled to the mover 51a may be pushed to return to its original position.

Because the first fixing member 52a and the second fixing member 52b may also return to their original positions, the first fixing member 52a and the second fixing member 52b may be caught by the locking wall 12a, and thus, the display module 10 and the stand arm 50 may be coupled to each other.

Figure 13:
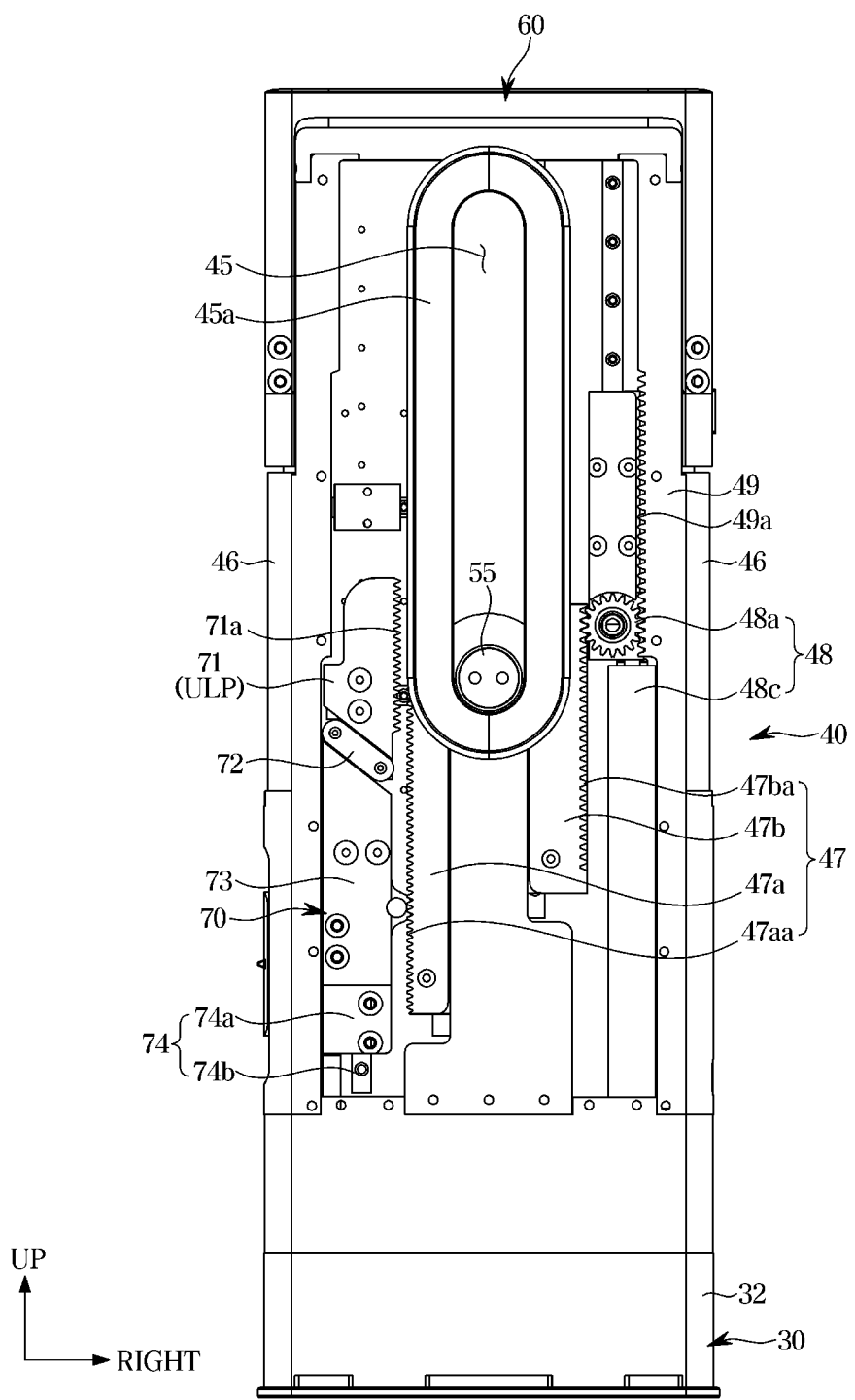
FIG. 13 is a plan view illustrating a locker including a stopper located at an unlocking position and a support stand omitting a supporter cover, according to an embodiment of the disclosure.
Figure 14:
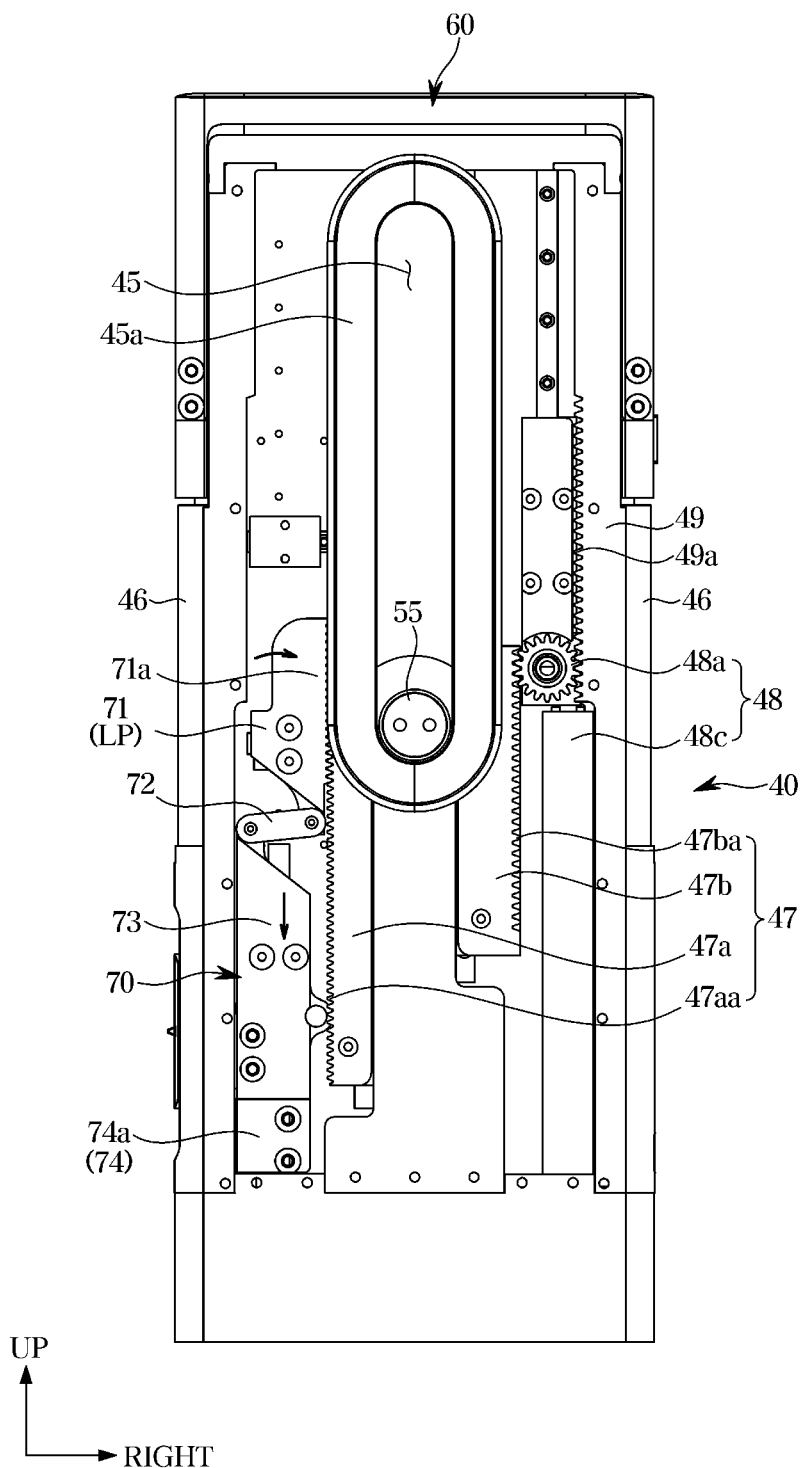
FIG. 14 is a plan view illustrating a locker including a stopper located at a locking position and a support stand omitting a supporter cover, according to an embodiment of the disclosure.
Figure 15:
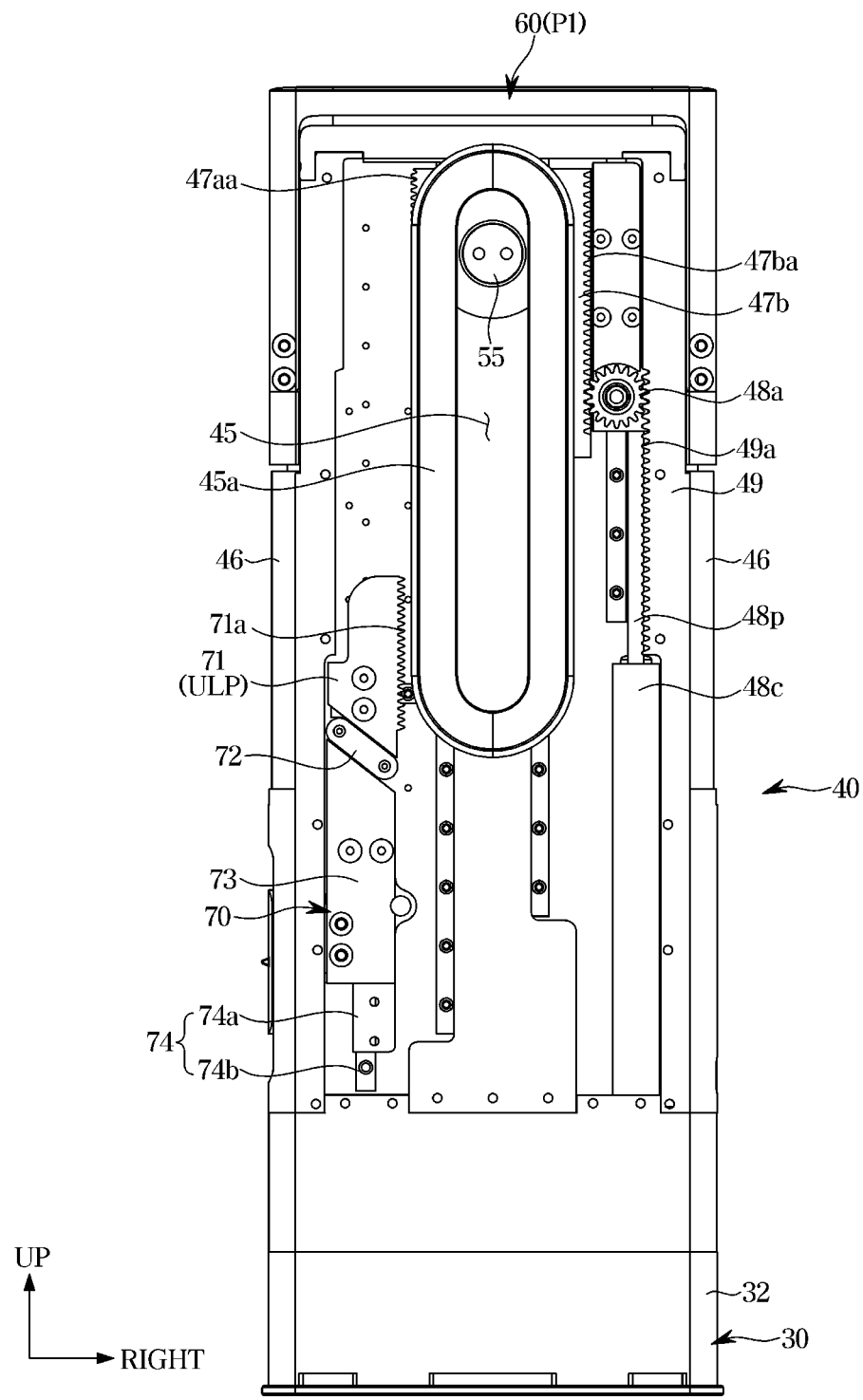
FIG. 15 is a plan view illustrating an arm coupling portion moving upward and a support stand omitting a supporter cover, according to an embodiment of the disclosure.
Figure 16:
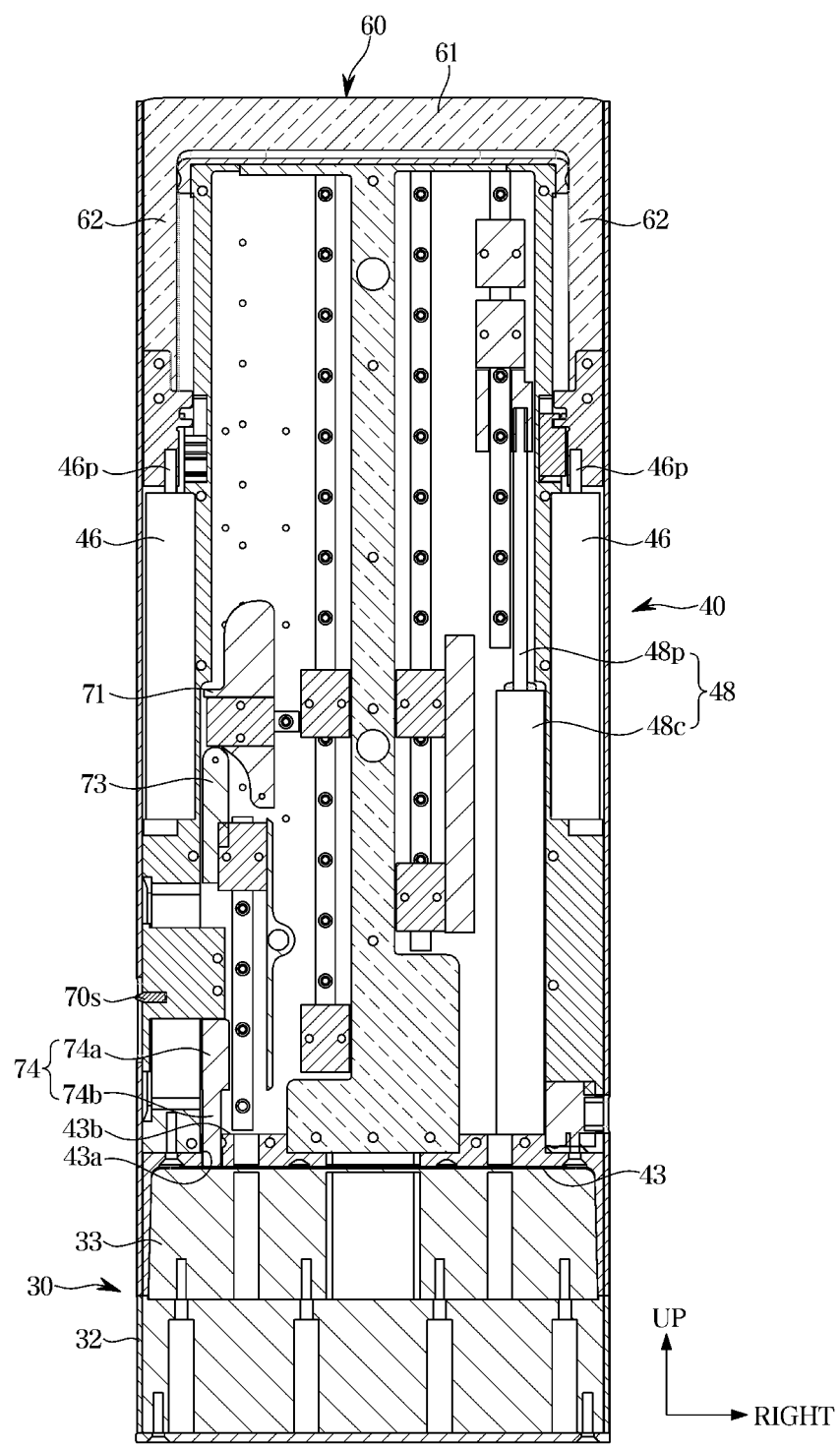
FIG. 16 is a cross-sectional view illustrating a locker switch, according to an embodiment of the disclosure.

FIG. 13 is a plan view illustrating a locker including a stopper located at an unlocking position and a support stand omitting a support cover, according to an embodiment of the disclosure. FIG. 14 is a plan view illustrating a locker including a stopper located at a locking position and a support stand omitting a cover, according to an embodiment of the disclosure. FIG. 15 is a plan view illustrating an arm coupling portion moving upward and a support stand omitting a cover, according to an embodiment of the disclosure. FIG. 16 is a cross-sectional view illustrating a locker switch, according to an embodiment of the disclosure.

Referring to FIGS. 13 to 16, the display stand 20 (see FIG. 1) may include a locker 70 mounted in the support stand 40. The locker 70 may be configured to prevent the stand arm 50 from vertically moving along the slide groove 45.

The locker 70 may include a stopper 71, and a push protrusion 74 provided under the stopper 71 and protruding toward the supporter groove 43. The locker 70 may include a guide member 73 located on the push protrusion 74, and a link member 72 provided to connect the guide member 73 to the stopper 71.

The guide member 73 may be located between the push protrusion 74 and the stopper 71, to move the stopper 71 according to movement of the push protrusion 74. The link member 72 may be located between the guide member 73 and the stopper 71, and may move the stopper 71 as the guide member 73 is moved by the push protrusion 74.

The support stand 40 may include a slider 47 coupled to the stand arm 50 to slide along the slide groove 45. A first slider 47a located on the left of the slide groove 45 may be interfered with the stopper 71. A second slider 47b located on the right of the slide groove 45 may be interfered with a holding gear 48a.

Both the first slider 47a and the second slider 47b may be coupled to the arm coupling portion 55 and may move along the slide groove 45 as the arm coupling portion 55 moves along the slide groove 45. The first slider 47a and the second slider 47b may be located parallel to each other.

The first slider 47a and the second slider 47b may include rack gears 47aa and 47ba formed on sides in opposite directions. The rack gear 47aa of the first slider 47a may be engaged with an interference gear 71a of the stopper 71. The second slider 47b may be engaged with the holding gear 48a.

The stopper 71 may move between a locking position LP at which the stopper 71 is interfered with the first slider 47a to prevent the stand arm 50 from vertically moving along the slide groove 45 and an unlocking position ULP at which the stopper 71 is spaced apart from the first slider 47a to allow the stand arm 50 to vertically move along the slide groove 45.

A stopper guide (not shown) provided to guide movement of the stopper 71 may be mounted in the support stand 40 at the rear of the stopper 71. The stopper guide may be coupled to the stopper 71 to support the stopper 71 moving between the locking position and the unlocking position.

When the stopper 71 is located at the unlocking position ULP as shown in FIG. 13, the interference gear 71a may be spaced apart from the rack gear 47aa of the first slider 47a. When the stopper 71 is located at the locking position LP as shown in FIG. 14, the interference gear 71a may be provided to be interfered with the rack gear 47aa of the first slider 47a, thereby preventing movement of the first slider 47a.

In more detail, the stopper 71 may move between the locking position LP and the unlocking position ULP in response to movement of the guide member 73 by the link member 72. The guide member 73 may include a locker switch 70s. The guide member 73 may vertically move according to the locker switch 70s, and thus, when the guide member 73 moves upward, the stopper 71 may move clockwise from the locking position LP to the unlocking position ULP. When the guide member 73 moves downward, the stopper 71 may move counterclockwise from the unlocking position ULP to the locking position LP.

The guide member 73 may be vertically moved by the push protrusion 74 in addition to the locker switch 70s. The push protrusion 74 may be provided to be interfered with the supporter 30. The push protrusion 74 may move downward due to its weight to protrude to the supporter groove 43, and may move upward due to the supporter 30 inserted into the supporter groove 43.

The push protrusion 74 may include a locking portion 74a and a protrusion portion 74b. The locking portion 74a may be located on the protrusion portion 74b to support the guide member 73. The protrusion portion 74b may protrude from the locking portion 74a toward the supporter groove 43.

The support stand 40 may include a penetrating wall 43b including a through-hole 43a through which the protrusion portion 74b of the push protrusion 74 passes. The through-hole 43a may communicate with the supporter groove 43. The locking portion 74a may be caught by the penetrating wall 43b, and the protrusion portion 74b accommodated in the through-hole 43a may protrude to the supporter groove 43. Due to a structure in which the locking portion 74a is caught by the penetrating wall 43b, the push protrusion 74 and the guide member 73 supported by the push protrusion 74 may have fixed positions without falling from certain positions.

According to this structure, the protrusion portion 74b protruding toward the supporter groove 43 may be moved upward by the supporter 30, and thus, the stopper 71 may be located at the unlocking position ULP.

That is, when the support stand 40 is coupled to the supporter 30, because the stopper 71 may be located at the unlocking position ULP according to movement of the push protrusion 74, the display module 10 coupled to the stand arm 50 (see FIG. 3) may more easily vertically move without a separate manipulation. From the user's point of view, the display module 10 may be moved to a desired position without adjusting the locker switch 70s, thereby improving satisfaction.

While the stopper 71 is located at the unlocking position ULP, as shown in FIG. 15, the arm coupling portion 55 may move upward along the slide groove 45. As the arm coupling portion 55 moves, the first slider 47a and the second slider 47b may move.

When the arm coupling portion 55 coupled to the display module 10 vertically moves with acceleration along the slide groove 45, it may be difficult for the user to easily adjust a desired position of the display module 10. To solve this problem, a holding damper 48 may be mounted in the support stand 40 to reduce a speed of the arm coupling portion 55.

The holding damper 48 may be a hydraulic damper. The holding damper 48 may include a holding piston 48p, a holding cylinder 48c, and a holding gear 48a. The holding cylinder 48c may be connected to the holding gear 48a through the holding piston 48p. The holding damper 48 may smoothly adjust a position of the holding gear 48a connected to the holding piston 48p by using an internal hydraulic damper structure.

However, is the embodiments are not limited thereto, and the holding damper 48 may be formed of an elastic member. As such, a structure of the holding damper 48 may be any structure as long as it may reduce a speed of the arm coupling portion 55.

In more detail, the second slider 47b moving as the arm coupling portion 55 moves along the slide groove 45 may vertically move the holding gear 48a while rotating clockwise the holding gear 48a through the rack gear 47ba. The holding gear 48a may move by being engaged with a guide rack gear 49a of a gear guider 49 extending parallel to the slide groove 45 and located opposite to the rack gear 47ba of the second slider 47b.

As the holding gear 48a vertically moves, a length of the holding piston 48p extending from the holding cylinder 48c may be adjusted. The holding gear 48a may move by ½ of a moving distance of the arm coupling portion 55, and the holding gear 48a moved upward may further pull out the holding piston 48p from the holding cylinder 48c. As the holding piston 48p is pulled out from the holding cylinder 48c, a component such as oil in the holding cylinder 48c may reduce a speed at which the holding piston 48p is pulled out.

According to this structure, not only when the arm coupling portion 55 moves upward but also when the arm coupling portion 55 moves downward, a speed of the second slider 47b may be reduced. According to this structure, a speed of the display module 10 vertically movable along the slide groove 45 may be smoothly reduced, the user may more easily adjust a position of the display module 10, and impact of the arm coupling portion 55 to the edge wall 45a may be prevented, thereby improving durability.

Figure 17:
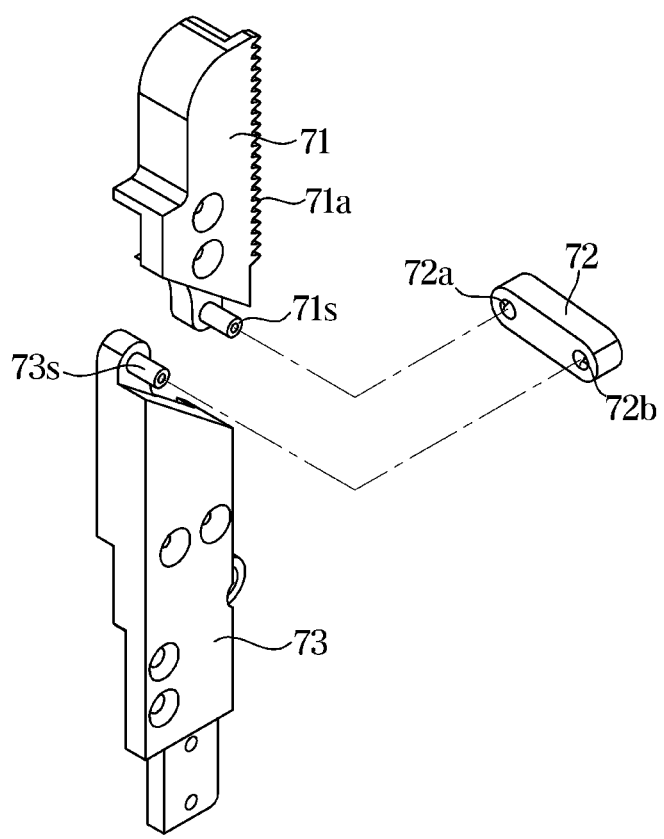
FIG. 17 is an exploded perspective view illustrating a stopper, a guide member, and a link member of FIG. 13.
Figure 18:
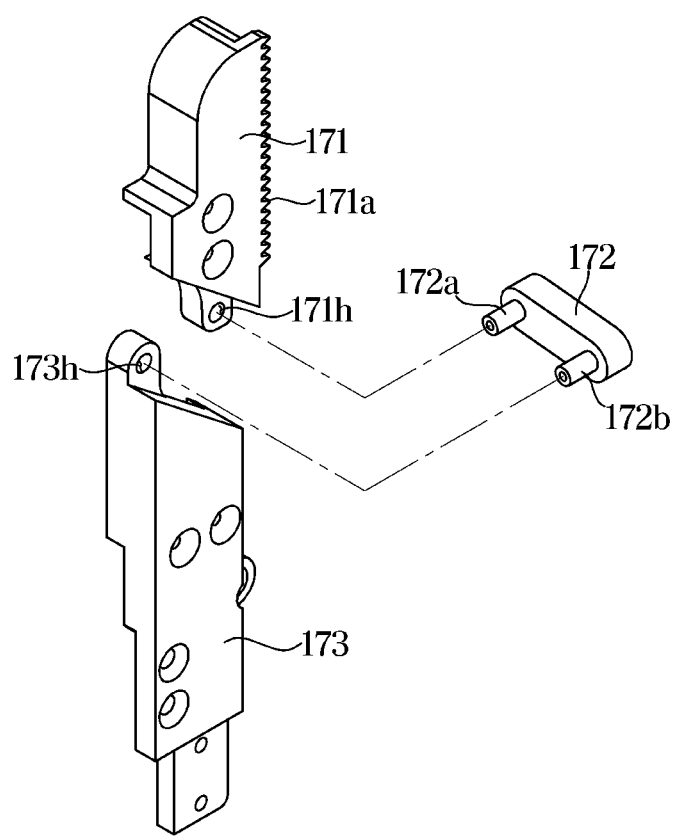
FIG. 18 is an exploded perspective view illustrating a stopper, a guide member, and a link member, according to an embodiment of the disclosure.

FIG. 17 is an exploded perspective view illustrating a stopper, a guide member, and a link member of FIG. 13. FIG. 18 is an exploded perspective view illustrating a stopper, a guide member, and a link member, according to an embodiment of the disclosure.

Referring to FIG. 17, the guide member 73 may include a coupling shaft 73s provided to be coupled to the link member 72. The stopper 71 may include a stopper shaft 71s provided to be coupled to the link member 72.

The link member 72 may include a coupling hole 72b located on a side thereof and provided so that the coupling shaft 73s is inserted into the coupling hole 72b, and a stopper hole 72a located on the other side and provided so that the stopper shaft 71s is inserted into the stopper hole 72a.

As the coupling shaft 73s of the guide member 73 is inserted into the coupling hole 72b of the link member 72, and the stopper shaft 71s of the stopper 71 is inserted into the stopper hole 72a of the link member 72, the link member 72 may rotate the stopper 71 in response to movement of the guide member 73.

For example, as the guide member 73 is moved upward by the push protrusion 74 as shown in FIG. 13, the link member 72 may move the stopper 71 to the unlocking position ULP. Also, as the guide member 73 is moved downward as shown in FIG. 14, the link member 72 may move the stopper 71 to the locking position LP.

Referring to FIG. 18, unlike in a structure of FIG. 17, a guide member 173 may include a guide hole 173h. The stopper 171 may include a stopper hole 171h and an interference gear 171a.

The link member 172 may include a coupling shaft 172b to be inserted into the coupling hole 173h, and a stopper shaft 172a to be inserted into the stopper hole 171h. The coupling shaft 172b may be provided on a side of the link member 172, and the stopper shaft 172a may be provided on the other side of the link member 172. According to this structure, as described above, the stopper 171 may be moved between the unlocking position ULP and the locking position LP by the link member 172 according to movement of the guide member 173.

Figure 19:
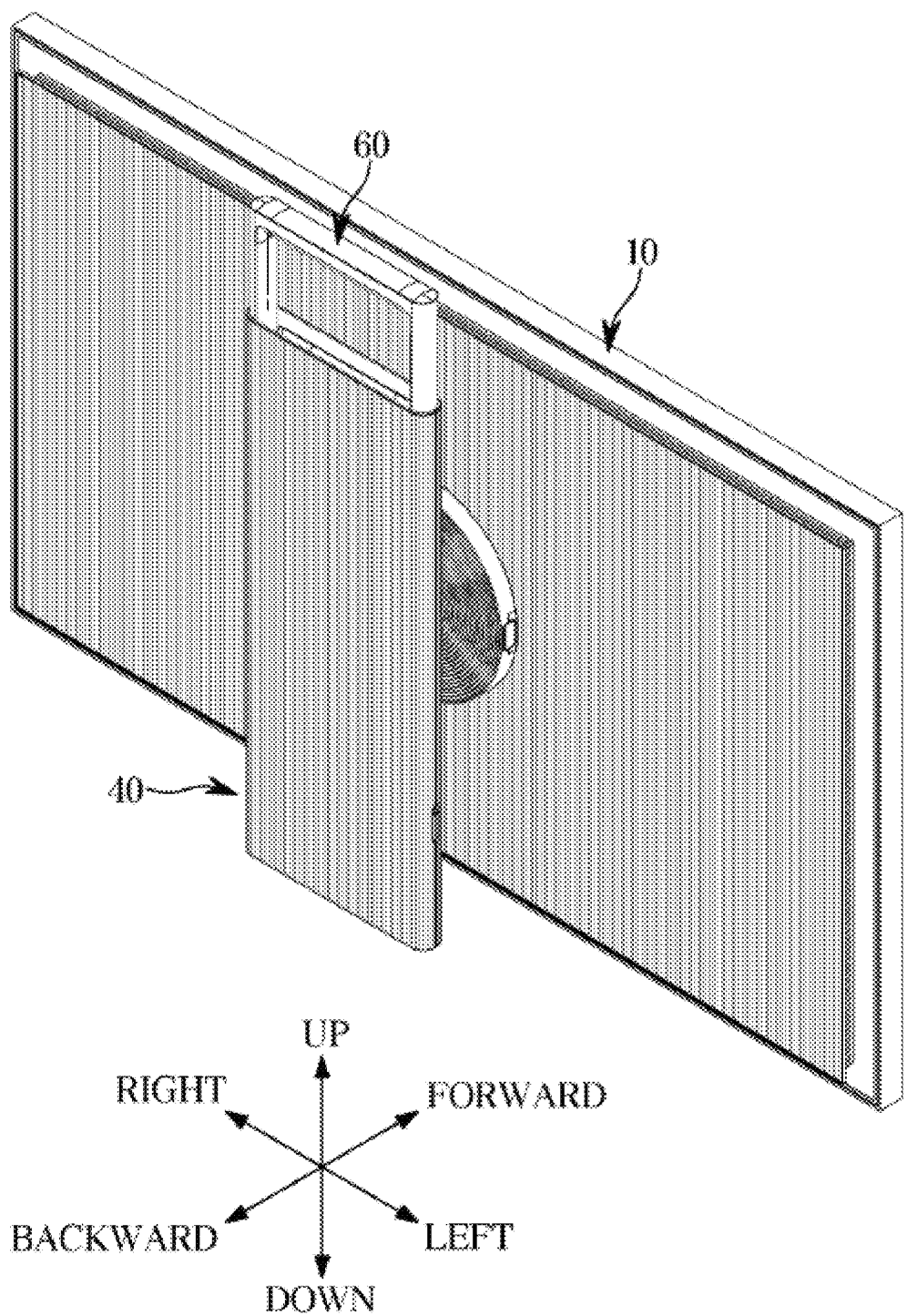
FIG. 19 is a rear perspective view illustrating a state in which a handle is pulled out from a support stand, according to an embodiment of the disclosure.
Figure 20:
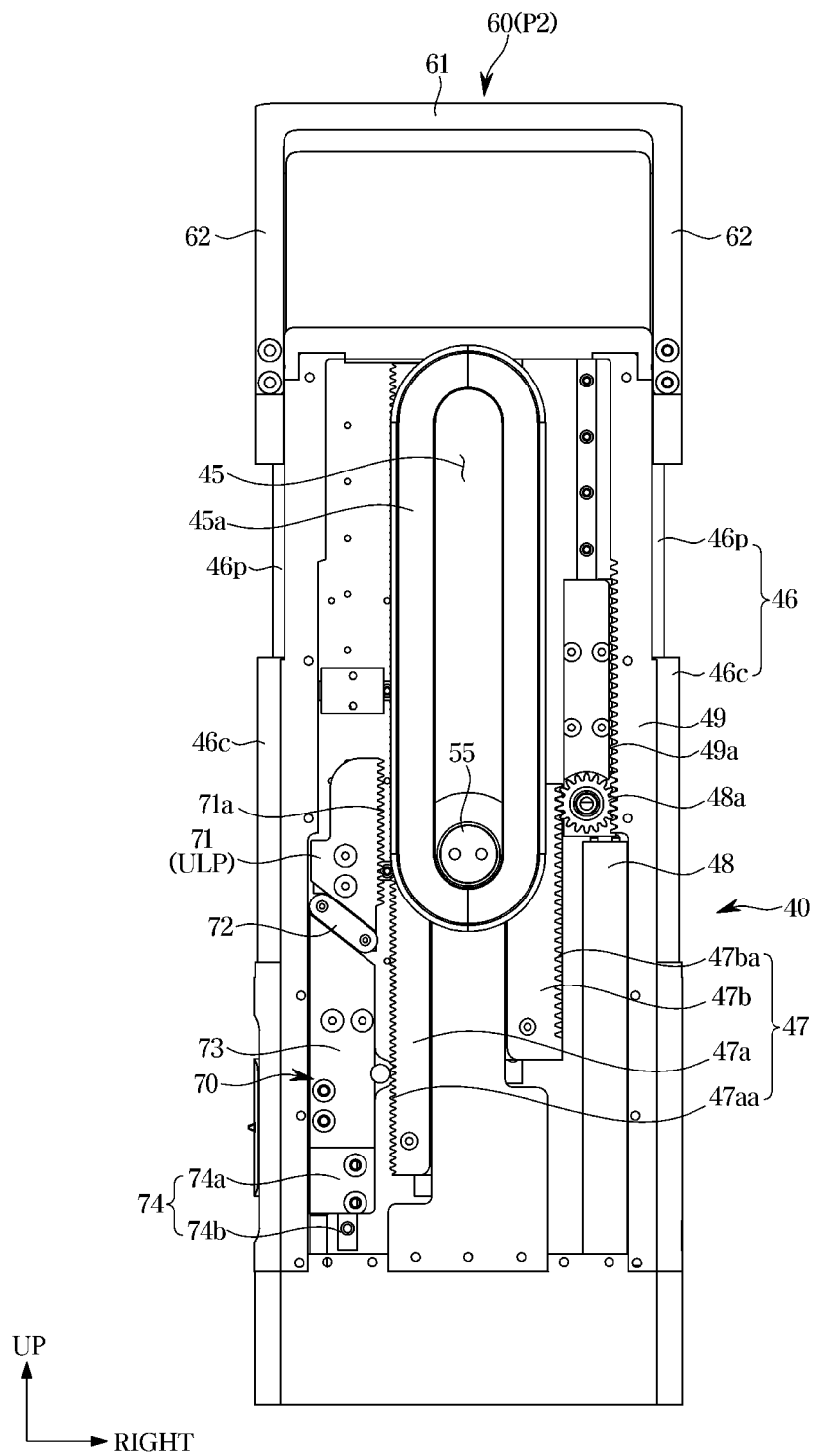
FIG. 20 is a plan view illustrating a state in which the handle of FIG. 19 is located at a second position.

FIG. 19 is a rear perspective view illustrating a state in which a handle is pulled out from a support stand, according to an embodiment of the disclosure. FIG. 20 is a plan view illustrating a state in which the handle of FIG. 19 is located at a second position.

Referring to FIGS. 15, 19, and 20, the display apparatus 1 may further include the handle 60 provided on the support stand 40. The handle 60 may be coupled to the support stand 40 to be pulled out upward from the support stand 40.

The display module 10 may be provided to be moveable according to the user's preference. In more detail, the display module 10 may be moved by the user wherever the user is and may output an image or the like to the user. In order for the display module 10 to be moved, the display module 10 may be moved by the handle 60 pulled out from the support stand 40 while being coupled to the support stand 40.

The handle 60 may be accommodated in a handle groove 41 (see FIG. 6) provided in an upper portion of the support stand 40. The handle 60 may include a holding portion 61 formed to be held by the user's hand, and insertion portions 62 extending from both sides of the holding portion 61 toward the support stand 40 to be inserted into the support stand 40.

The handle 60 may move between a first position P1 at which the insertion portions 62 are most deeply inserted into the support stand 40 and a second position P2 at which the insertion portions 62 pull out upward the holding portion 61 as much as possible from the support stand 40.

When the insertion portions 62 are clicked or pushed downward once when the handle 60 is located at the first position P1, the insertion portions 62 may move toward a handle damper 46 and then may slowly move upward. A position at which the holding portion 61 of the handle 60 is farthest from the support stand 40 may be a position when the handle 60 is located at the second position P2.

A pair of handle dampers 46 may be provided to support the insertion portions 62. The handle damper 46 may include a handle piston 46p and a handle cylinder 46c. As each insertion portion 62 pushes downward the handle piston 46p, the handle piston 46p may be inserted into the handle cylinder 46c.

Oil or a fluid in the handle cylinder 46c may cause the handle piston 46p inserted into the handle cylinder 46c to be pulled out from the handle cylinder 46c to push the insertion portion 62 upward. In this process, the handle piston 46p may be slowly pulled out from the support stand 40.

According to this structure, when the user pulls out the handle 60 from the support stand 40, the handle 60 may be gradually pulled out from the support stand 40, thereby reducing impact to the handle 60. That is, the durability of the handle 60 may be improved. Also, because the user may pull out the handle 60 from the support stand 40 with only one click, the display module 10 (see FIG. 1) and the support stand 40 may be more conveniently transported.

When the holding portion 61 and the insertion portions 62 are pushed downward when the handle 60 is located at the second position P2, the holding portion 61 may be accommodated in the handle groove 41 (see FIG. 6) to have a fixed position.

According to this structure, the display module 10 may be moved, and when the user does not move the display module 10, the handle 10 may be pushed toward the support stand 40, thereby improving aesthetics.

The handle damper 46 is not limited to a hydraulic damper, and may be formed of an elastic member. Also, the handle damper 46 may have any structure as long as it may smoothly pull out the handle 60.

FIG. 21 is a rear perspective view illustrating a state in which a support stand tilts a display module, according to an embodiment of the disclosure.

Referring to FIG. 21, the display apparatus 1 may locate the support stand 40 to support the display module 10 even when the support stand 40 is not coupled to the supporter 30.

Because the support stand 40 may be rotatable on the stand arm 50, when the display module 10 is inclined backward toward an upper side, and the support stand 40 is inclined forward toward an upper side, the display module 10 may be supported only by the support stand 40.

As shown in FIG. 21, a mode in which the display module 10 is inclined with respect to the support stand 40 may be referred to as a tilt mode.

According to this structure, the user may locate the display module 10 on the inclined support stand 40 at a desired location and at a desired time, even without the supporter 30 during transportation, and may see an image transmitted from the display module 10 or use a processor.

Figure 22:
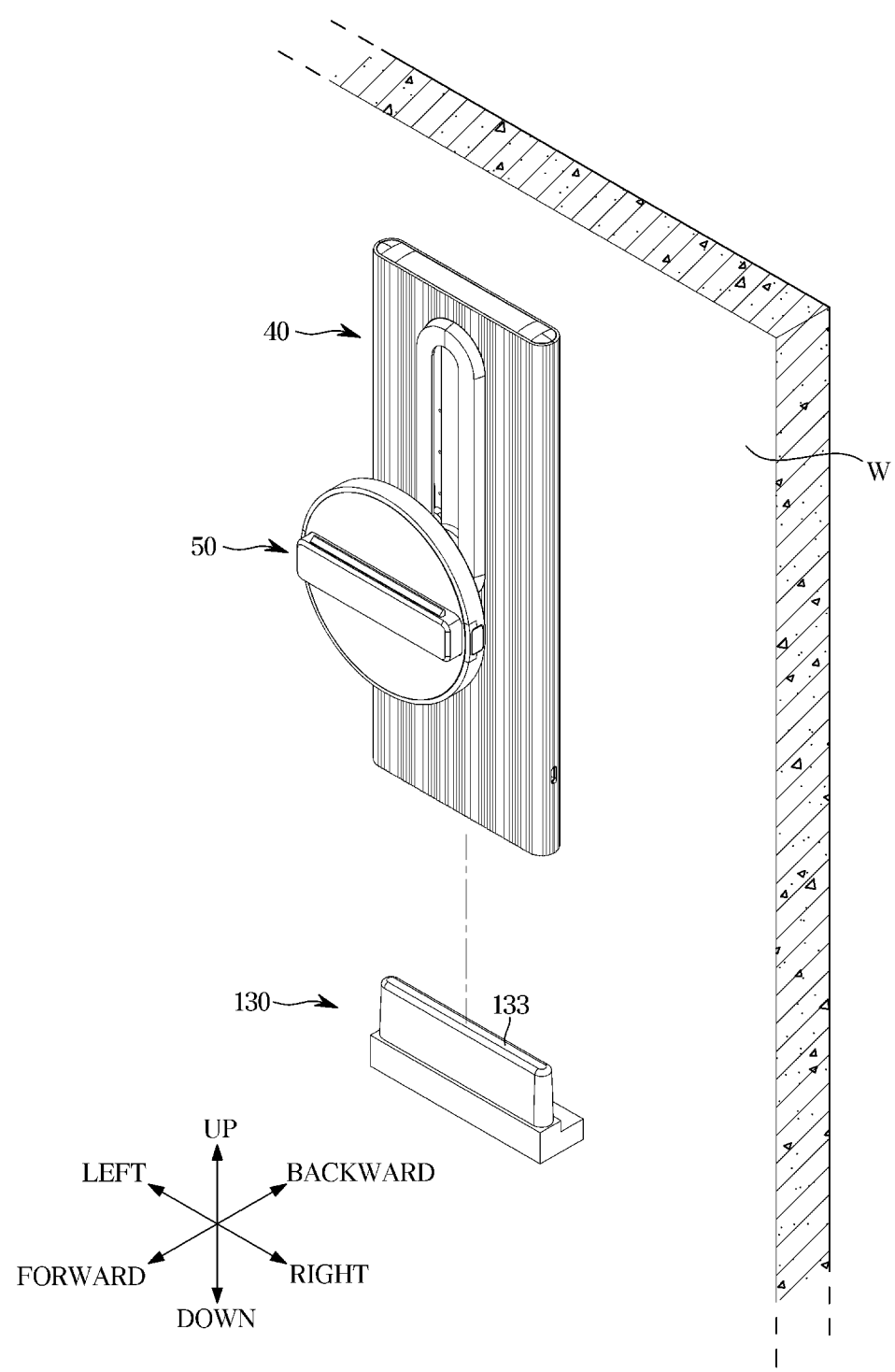
FIG. 22 is a perspective view illustrating a state in which a stand leg integrally formed with a wall and a support stand are coupled to each other, according to an embodiment of the disclosure.

FIG. 22 is a perspective view illustrating a state in which a stand leg integrally formed with a wall and a support stand are coupled to each other, according to an embodiment of the disclosure.

Referring to FIG. 22, a supporter 130 may be integrally formed with a wall W. An insertion protrusion 133 of the supporter 130 may face upward, and the support stand 40 may include a supporter groove into which the insertion protrusion 133 of the supporter 130 is inserted.

The insertion protrusion 133 inserted into the supporter groove may support the support stand 40, and thus, the stopper 71 of the locker 70 (see FIG. 13) may be located at the unlocking position ULP, to freely vertically move the stand arm 50 provided to be coupled to the display module 10 along the slide groove 45.

Effects of this structure are the same as described above.

FIG. 23 is a perspective view illustrating a support stand, according to an embodiment of the disclosure.

Referring to FIG. 23, a support stand 140 may include a configuration of a push protrusion 174 provided on a lower portion to be exposed to the outside, instead of a supporter groove. According to this structure, when the support stand 140 is located in a tilt mode as shown in FIG. 21, a protrusion 174b of the push protrusion 174 may be pushed by the floor or the like to be inserted into the support stand 140.

As the protrusion 174b of the push protrusion 174 is inserted into the support stand 140, the stopper 71 of the locker 70 (see FIG. 13) may be located at the unlocking position ULP. Accordingly, the user may immediately move the display module 10 and the stand arm 50 in a slide groove 145 even without adjusting the separate locker switch 70s or the like.

There may be provided a display stand that may vertically move or rotate a display module.

There may be provided a display stand that may transport a display module and may support a display.

There may be provided a display stand that may lock or unlock vertical movement of a display module, thereby improving user convenience.

Technical effects of the disclosure are not limited thereto, and other unmentioned technical effects will be apparent to one of ordinary skill in the art from the following description.

Specific embodiments have been shown and described. However, it would be appreciated by those skilled in the art that changes may be made in these embodiments without departing from the principles and spirit of the disclosure, the scope of which is defined in the claims and their equivalents.

What is claimed is:

1. A display stand comprising:
    a support stand comprising a slide groove extending in one direction;
    a stand arm couplable to a display module and configured to be movable along the slide groove;
    a slider mounted in the support stand, the slider being coupled to the stand arm and being configured to slide in the one direction with the stand arm;
    a locker mounted in the support stand, the locker comprising a stopper movable between a locking position and an unlocking position, when in the locking position, the stopper being interfered with the slider to prevent the stand arm from moving in the one direction along the slide groove, when in the unlocking position, the stopper being spaced apart from the slider to allow the stand arm to move in the one direction along the slide groove; and
    a supporter couplable to the support stand, the supporter being configured to support the support stand and retain the stopper at the unlocking position by being coupled to the support stand.

2. The display stand of claim 1,
    wherein the locker further comprises a push protrusion configured to interfere with the supporter,
    wherein the supporter is configured to push the push protrusion to locate the stopper at the unlocking position.

3. The display stand of claim 2, wherein the support stand further comprises a supporter groove configured to receive the supporter when inserted,
    wherein the push protrusion is configured to be pushed by the supporter that is inserted into the supporter groove.

4. The display stand of claim 3, wherein the supporter groove is disposed in a lower portion of the support stand.

5. The display stand of claim 2,
    wherein the support stand further comprises a penetrating wall comprising a through-hole configured to receive the push protrusion,
    wherein the push protrusion comprises
    a protrusion portion configured to be accommodated in the through-hole and to contact the supporter, and
    a locking portion connected to the protrusion portion, the locking portion being configured to be caught by the penetrating wall.

6. The display stand of claim 1, wherein the locker further comprises:
    a guide member disposed on the support stand, the guide member being configured to be movable in the one direction; and
    a link member disposed between the guide member and the stopper, and configured to move the stopper as the guide member moves.

7. The display stand of claim 6,
    wherein the locker further comprises a push protrusion extending from the guide member and configured to interfere with the supporter,
    wherein the guide member is disposed on an upper side of the push protrusion and is configured to be moveable in the one direction as the push protrusion moves,
    wherein the stopper is disposed at an upper side of the guide member, and
    wherein the link member is configured to move the stopper as the guide member is moved in the one direction by the push protrusion.

8. The display stand of claim 6,
    wherein the guide member comprises a coupling shaft configured to couple to the link member,
    wherein the stopper comprises a stopper shaft configured to couple to the link member, and
    wherein the link member comprises a coupling hole into which the coupling shaft is configured to insert, and a stopper hole into which the stopper shaft is configured to insert.

9. The display stand of claim 6,
wherein the link member is configured to move the stopper to the unlocking position as the guide member moves upward, and
wherein the link member is configured to move the stopper to the locking position as the guide member moves downward.

10. The display stand of claim 1,
wherein the slider comprises a rack gear extending in the one direction, and
wherein the stopper comprises an interference gear configured to engage with the rack gear when the stopper is in the locking position.

11. The display stand of claim 1,
wherein the slider is a first slider,
wherein the display stand further comprises:
a second slider mounted in the support stand, the second slider being coupled to the stand arm and being configured to slide in the one direction along the slide groove, the second slider being disposed in parallel with the first slider; and
a holding damper configured to reduce a speed of the second slider moving in the one direction along the slide groove.

12. The display stand of claim 11, wherein the holding damper comprises a hydraulic damper.

13. The display stand of claim 1, further comprising a handle coupled to an upper side of the support stand, the handle being configured to be slidably withdrawn from the support stand.

14. The display stand of claim 13,
wherein the handle comprises a holding portion, and insertion portions extending from opposite sides of the holding portion toward the support stand, the insertion portions being slidably insertable into the support stand,
wherein the display stand further comprises a handle damper located at a lower side of the insertion portions, the handle damper being configured to move the insertion portions in the one direction.

15. The display stand of claim 1, wherein the support stand comprises a battery provided therein, the battery being configured to apply power to the display module.

16. A display stand comprising:
a stand arm couplable to a display module;
a support stand configured to support the stand arm such that the stand arm is configured to rotate with respect to the support stand, the support stand comprising a slide groove configured to guide movement of the stand arm in one direction such that the display module coupled to the stand arm moves in the one direction;
a slider mounted in the support stand, the slider being configured to move in the one direction along the slide groove with the stand arm;
a locker disposed at a side of the slider, the locker comprising a stopper and a push protrusion, the stopper being movable between a locking position and an unlocking position, when in the locking position, the stopper being interfered with the slider to prevent slider from moving in the one direction, when in the unlocking position, the stopper being spaced apart from the slider to allow the slider to move in the one direction, the push protrusion being configured to guide movement of the stopper between the locking position and the unlocking position; and
a supporter coupled to the support stand, the supporter being configured to support the support stand,
wherein the supporter is configured to push the push protrusion into the support stand, causing the stopper to be moved from the locking position to the unlocking position.

17. The display stand of claim 16,
wherein the support stand further comprises a supporter groove disposed in a lower portion of the support stand such that the supporter is configured to insert into the supporter groove,
wherein the push protrusion is configured to protrude into the supporter groove.

18. The display stand of claim 16, wherein the locker further comprises:
a guide member disposed at an upper side of the push protrusion, the guide member being configured to move in the one direction by the push protrusion; and
a link member disposed between the guide member and the stopper, the link member being configured to move the stopper between the locking position and the unlocking position as the guide member moves.

19. The display stand of claim 16,
wherein the slider is a first slider,
wherein the display stand further comprises:
a second slider mounted in the support stand, the second slider being coupled to the stand arm and being configured to slide in the one direction along the slide groove, the second slider being disposed in parallel with the first slider; and
a holding damper configured to reduce a speed of the second slider moving in the one direction along the slide groove, the holding damper comprising a holding gear engaged with the second slider.

20. A display apparatus comprising:
a display module;
a stand arm coupled to the display module, the stand arm being configured to support the display module;
a support stand extending in one direction, the support stand being configured to support the stand arm such that the stand arm is movable, the support stand comprising a slide groove extending in the one direction, the slide groove being configured to guide movement of the stand arm in the one direction;
a slider mounted in the support stand, the slider being movable in the one direction along the slide groove with the stand arm;
a locker mounted in the support stand, the locker comprising a stopper movable between a locking position and an unlocking position, when in the locking position, the stopper being interfered with the slider to prevent the stand arm from moving in the one direction along the slide groove, when in the unlocking position, the stopper being spaced apart from the slider to allow the stand arm to move in the one direction along the slide groove; and
a supporter couplable to the support stand, the supporter being configured to support the support stand, and retain the stopper at the unlocking position by being coupled to the support stand.

\* \* \* \* \*